United States Patent
Thubert et al.

(10) Patent No.: US 10,715,422 B2
(45) Date of Patent: Jul. 14, 2020

(54) PROACTIVE REFORM OF DIRECTED ACYCLIC GRAPH BY ACCELERATING PARENT ADVERTISEMENTS

(71) Applicant: Cisco Technology, Inc., San Jose, CA (US)

(72) Inventors: Pascal Thubert, La Colle Sur Loup (FR); Jianzhou Chen, Nanjing (CN); Huimin She, Shanghai (CN); Patrick Wetterwald, Mouans Sartoux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 71 days.

(21) Appl. No.: 16/026,203

(22) Filed: Jul. 3, 2018

(65) Prior Publication Data

US 2020/0014618 A1   Jan. 9, 2020

(51) Int. Cl.
*H04L 12/761* (2013.01)
*H04L 12/753* (2013.01)
(Continued)

(52) U.S. Cl.
CPC .......... *H04L 45/28* (2013.01); *H04L 43/0817* (2013.01); *H04L 45/02* (2013.01);
(Continued)

(58) Field of Classification Search
CPC ..... H04L 45/28; H04L 43/0817; H04L 45/02; H04W 28/0231; H04W 28/021; H04W 24/04
See application file for complete search history.

(56) References Cited

U.S. PATENT DOCUMENTS 8,102,775 B2   1/2012   Thubert
8,472,348 B2   6/2013   Hui et al.
(Continued)

FOREIGN PATENT DOCUMENTS

CN   105071955 A  *  11/2015
CN   105071955 A     11/2015
(Continued)

OTHER PUBLICATIONS

Levis et al., The Trickle Algorithm, IETF RFC 6206, Mar. 2011 (Year: 2011).*
(Continued)

*Primary Examiner* — Shailendra Kumar
(74) *Attorney, Agent, or Firm* — Leon R. Turkevich

(57) ABSTRACT

In one embodiment, a parent network device, operating according to a first Trickle operation using a first selected minimum contention interval, responds to detecting a loss of attached child network devices by starting a second Trickle operation using a second selected minimum contention interval. The second Trickle operation includes maintaining the second selected minimum contention interval for subsequent iterations of the second Trickle operation. The parent network device initiates an accelerated transmission rate of the advertisement message that is faster than the first and second Trickle operations (using a third selected minimum contention interval less than the first minimum contention interval) in response to receiving a message from one of the lost child network devices, and resumes the first Trickle operation upon recovery of all the lost child network devices.

20 Claims, 15 Drawing Sheets

(51) Int. Cl.
  *H04L 12/705* (2013.01)
  *H04L 12/751* (2013.01)
  *H04L 12/703* (2013.01)
  *H04W 28/02* (2009.01)
  *H04L 12/26* (2006.01)
  *H04W 24/04* (2009.01)

(52) U.S. Cl.
  CPC ..... *H04W 28/021* (2013.01); *H04W 28/0231* (2013.01); *H04W 24/04* (2013.01)

(56) References Cited

U.S. PATENT DOCUMENTS

| | | | |
|---|---|---|---|
| 9,420,518 | B2 | 8/2016 | Purohit et al. |
| 9,641,382 | B2 | 5/2017 | Hui et al. |
| 9,647,494 | B2 | 5/2017 | Hui et al. |
| 9,785,509 | B2 | 10/2017 | Hui et al. |
| 9,893,985 | B2 | 2/2018 | Hui et al. |
| 2013/0010615 | A1 | 1/2013 | Hui et al. |
| 2013/0208583 | A1 | 8/2013 | Guo et al. |
| 2015/0003227 | A1 | 1/2015 | Splitz et al. |
| 2015/0373735 | A1 | 12/2015 | Thubert et al. |
| 2016/0020997 | A1 | 1/2016 | Hui et al. |
| 2016/0132397 | A1 | 5/2016 | Hui et al. |
| 2016/0134161 | A1 | 5/2016 | Hui et al. |
| 2016/0149805 | A1 | 5/2016 | Hui et al. |
| 2017/0070942 | A1* | 3/2017 | Denteneer ........... H04W 40/248 |
| 2017/0364409 | A1 | 12/2017 | Hui et al. |
| 2018/0070379 | A1 | 3/2018 | Thubert et al. |
| 2018/0091407 | A1* | 3/2018 | Tervonen ................. H04J 3/06 |

FOREIGN PATENT DOCUMENTS

| | | | |
|---|---|---|---|
| KR | 101755596 | B1 * | 7/2017 |
| KR | 101755596 | B1 | 7/2017 |

OTHER PUBLICATIONS

Winter et al., RPL: IPv6 Routing Protocol for Low-Power and Lossy Networks, RFC 6550, Mar. 2012 (Year: 2012).*

Thubert, Objective Function Zero for the Routing Protocol for Low-Power and Lossy Networks (RPL), RFC 6552, Mar. 2012. (Year : 2012).*

Smith, "802.11 QoS Requirements", [online], Nov. 10, 2008, [retrieved on Mar. 29, 2018]. Retrieved from the Internet: URL: <http://ieee802.org/1/files/public/docs2008/avb-gs-802-11-qos-tutorial-1108.pdf>, pp. 1-24.

Cisco Systems, Inc., "Cisco Connected Grid WPAN Module for CGR 1000 Series Installation and CG-Mesh Configuration Guide", [online], Jun. 2017, [retrieved on Apr. 4, 2018]. Retrieved from the Internet: URL: <https://www.cisco.com/c/en/us/td/docs/routers/connectedgrid/modules/wpan/release_5-0/Cisco_Connected_Grid_WPAN_Module_for_CGR_1000_Series_Installation_and_CG-Mesh_Configuration_Guide.pdf>, pp. 1-52.

Paradisi et al., "Routing Algorithms for Wireless Sensor Networks", [online], Vrije Universiteit Brussel, May 9, 2014, [retrieved on Mar. 14, 2018]. Retrieved from the Internet: URL: <https://www.slideshare.net/asobimat/rpl-dodag>, pp. 1-37.

Yassein et al., "A New Dynamic Trickle Algorithm for Low Power and Lossy Networks", [online], Sep. 2016, [retrieved on Mar. 14, 2018]. Retrieved from the Internet: URL: <https://www.researchgate.net/publication/310478974_A_New_Dynamic_Trickle_Algorithm_for_Low_Power_and_Lossy_Networks>, pp. 1-7.

Tian et al., "A Fast DODAG Formation Method to Improve Trickle Algorithm with RPL", [online], IEEE WISPNET 2017 Conference, Feb. 22, 2018, [retrieved on Mar. 14, 2018]. Retrieved from the Internet: URL: <http://ieeexplore.ieee.org/document/8299829/>, pp. 603-606.

Levis et al., "The Trickle Algorithm", Internet Engineering Task Force (IETF), Request for Comments: 6206, Mar. 2011, pp. 1-13.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Thubert, Ed., "Objective Function Zero for the Routing Protocol for Low-Power and Lossy Networks (RPL)", Internet Engineering Task Force (IETF), Request for Comments: 6552, Mar. 2012, pp. 1-14.

Thubert et al., U.S. Appl. No. 15/446,705, filed Mar. 8, 2017.
Thubert et al., U.S. Appl. No. 15/902,028, filed Feb. 22, 2018.
Thubert et al., U.S. Appl. No. 15/954,786, filed Apr. 17, 2018.
She et al., U.S. Appl. No. 16/004,245, filed Jun. 8, 2018.

* cited by examiner

PROACTIVE REFORM OF DIRECTED ACYCLIC GRAPH BY ACCELERATING PARENT ADVERTISEMENTS

TECHNICAL FIELD

The present disclosure generally relates to proactive reform of a directed acyclic graph by accelerating parent advertisements.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function of the RPL instance. The "child" network device, upon attaching to its parent, can output its own DIO with updated network topology metrics that enable other network devices to discover the DODAG, learn the updated network topology metrics, and select a DODAG parent.

Any RPL node that is "powered up" can potentially output one or more DODAG Information Solicitation (DIS) messages as a probe for nearby DODAGs. Any RPL node that is "powered up" also can potentially advertise itself as a root of a "floating" DODAG based on outputting its own DIO specifying the advertised DODAG is floating.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
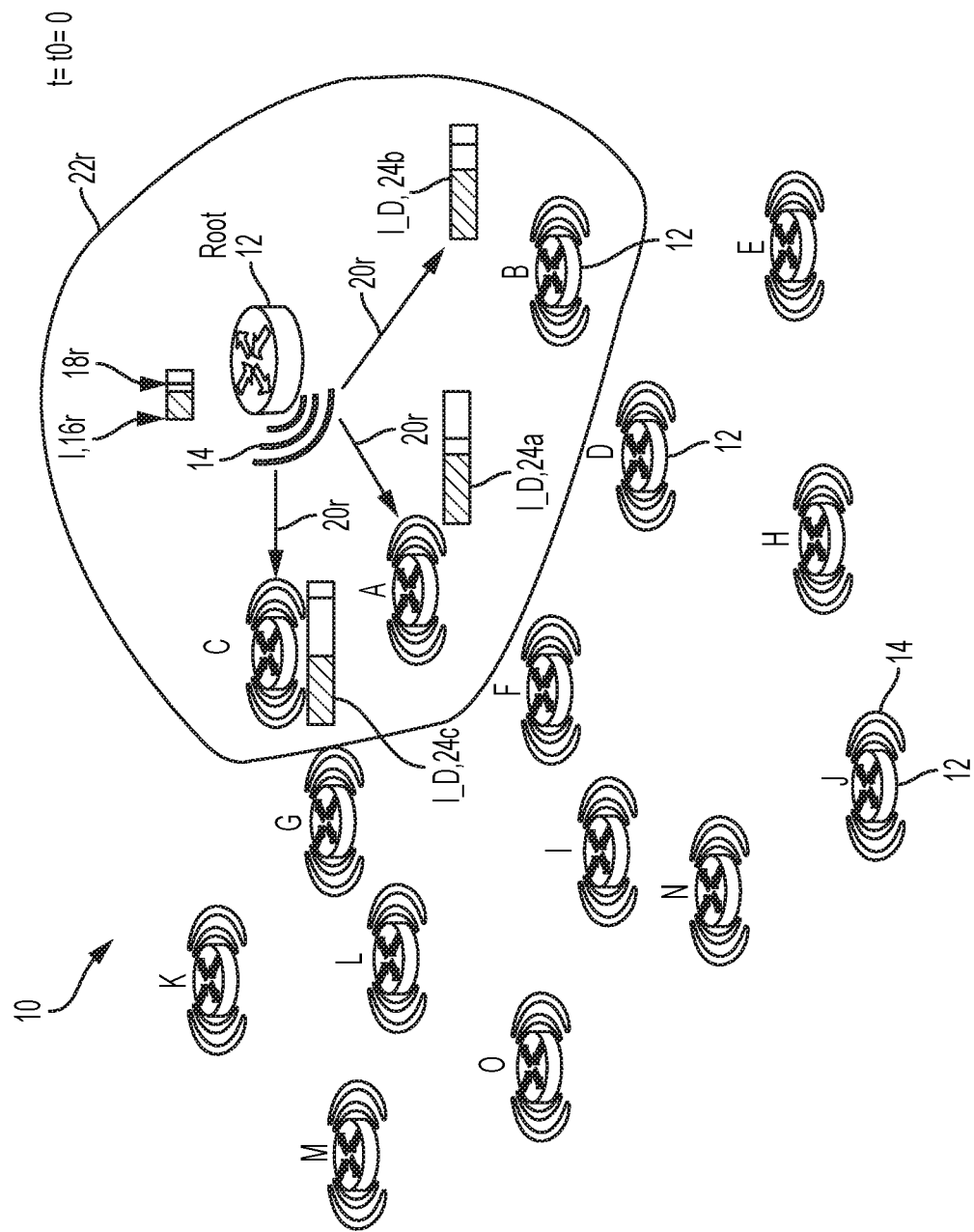
FIGS. 1A-1E illustrates an example data network having RPL network devices for executing deferred transmission operations that defer to prescribed transmission operations by higher devices that are closer to a RPL root, according to an example embodiment.

In one embodiment, a method comprises: detecting, by a parent network device operating according to a first Trickle operation relative to a first selected minimum contention interval in a data network having a tree-based topology, a loss of attached child network devices in the data network; starting, by the parent network device, a second Trickle operation relative to a second selected minimum contention interval in response to detecting the loss, the first Trickle operation and the second Trickle operation each requiring the parent network device to wait at least a first half of the corresponding selected minimum contention interval before attempting transmission of an advertisement message at a randomized position within a second half of the corresponding selected minimum contention interval, the second Trickle operation including maintaining the second selected minimum contention interval for subsequent iterations of the second Trickle operation; and initiating, by the parent network device in response to receiving a message from one of the lost child network devices, an accelerated transmission rate of the advertisement message that is faster than the first and second Trickle operations, and resuming the first Trickle operation upon recovery of all the lost child network devices.

In another embodiment, an apparatus comprises a device interface circuit and a processor circuit. The processor circuit is configured for detecting a loss of attached child network devices in a data network. The apparatus operating as a parent network device in the data network having a tree-based topology. The processor circuit is configured for operating according to a first Trickle operation relative to a first selected minimum contention interval. The processor circuit further is configured for starting execution of a second Trickle operation relative to a second selected minimum contention interval in response to detecting the loss. The first Trickle operation and the second Trickle operation each require the parent network device to wait at least a first half of the corresponding selected minimum contention interval before attempting transmission, by the device interface circuit, of an advertisement message at a randomized position within a second half of the corresponding selected minimum contention interval. The execution of the second Trickle operation includes the processor circuit maintaining the second selected minimum contention interval for subsequent iterations of the second Trickle operation. The processor circuit further is configured for initiating, in response to the device interface circuit receiving a message from one of the lost child network devices, an accelerated transmission rate of the advertisement message that is faster than the first and second Trickle operations, and resuming the first Trickle operation upon recovery of all the lost child network devices.

In another embodiment, one or more non-transitory tangible media are encoded with logic for execution by a machine and when executed by the machine operable for: detecting, by the machine implemented as a parent network device operating according to a first Trickle operation relative to a first selected minimum contention interval in a data network having a tree-based topology, a loss of attached child network devices in the data network; starting, by the parent network device, a second Trickle operation relative to a second selected minimum contention interval in response to detecting the loss, the first Trickle operation and the second Trickle operation each requiring the parent network device to wait at least a first half of the corresponding selected minimum contention interval before attempting transmission of an advertisement message at a randomized position within a second half of the corresponding selected minimum contention interval, the second Trickle operation including maintaining the second selected minimum contention interval for subsequent iterations of the second Trickle operation; and initiating, by the parent network device in response to receiving a message from one of the lost child network devices, an accelerated transmission rate of the advertisement message that is faster than the first and second Trickle operations, and resuming the first Trickle operation upon recovery of all the lost child network devices.

DETAILED DESCRIPTION

Particular embodiments enable network devices in a LLN data network having a DAG topology to execute fast and proactive reform of a directed acyclic graph (DAG) in a data network having encountered at least a partial power outage, based on suppression of transmission by child network devices, and accelerating parent advertisements: the suppression of transmission by child network devices having recovered from a power outage ensures that the child network device do not interfere with attempts by parent network devices to transmit advertisement messages for reformation (i.e., recovery) of a network topology. The acceleration of parent advertisements (especially in combination with suppression by the child network devices) enables parent network device to proactively reform a RPL DAG in a portion of the DAG having encountered a power loss, as the child network devices can rapidly rejoin their preferred parents without the necessity of transmitting any request messages.

Hence, the proactive reform of a DAG based on acceleration of parent advertisements, in combination with suppression of child network device transmissions in response to recovery of a power outage, ensures that the child network devices having encountered the power outage can quickly rejoin a directed acyclic graph. The proactive reform of the DAG minimizes losses in the DAG topology; hence, the DAG (and associated services) suffer minimal losses associated with any power loss (including network reachability, revenue generation associated with traffic transported via the network reachability, etc.).

A description will first be provided of an example initial network formation of the DAG, followed by a description of the proactive reform of the DAG by accelerating parent advertisements.

Concentric Transmissions in a Directed Acyclic Graph Based on Deferred Contention to Higher Devices Particular embodiments cause network devices in a data network to defer to higher network devices that are closer to a root of a DAG network topology in a data network, based on causing the network devices to execute a deferred transmission operation that defers (i.e., grants a higher priority) to the higher network devices in the DAG network topology. The deferred transmission operation defers to the higher devices that are executing a prescribed transmission operation, for example a prescribed discovery operation comprising attempted transmission of discovery information messages (e.g., DIO messages) at a randomized position after a selected minimum contention interval, for example according to the Trickle Algorithm specified under the Internet Engineering Task Force (IETF) Request for Comments (RFC) 6206 and according to the RPL protocol as specified in RFC 6550.

Conventional deployments of the RPL protocol (e.g., according to RFC 6550) can suffer from many hours of delay in initialization of a DAG network topology in LLNs that contain thousands of network devices that are densely deployed in the data network. For example, a smart grid Advanced Metering Infrastructure (AMI) network can utilize a connected grid mesh (CG-Mesh) that comprises a field area router (FAR) and thousands of network devices, where each network device can reach, within its transmission range, hundreds of neighboring network devices.

RFC 6550 permits a network device when powered up to proactively transmit one or more DIS messages to solicit transmission of a DIO message from a neighboring network device, or the powered-up network device can proactively transmit a DIO message specifying itself as a root of a floating DAG: although such proactive operations may appear beneficial in enabling a limited number of powered-up devices to attach to an existing DAG network topology, such operations by a powered-up device can interfere with initialization of the DAG network topology that relies on propagation of DIO messages outward from the DAG root (i.e., root-originated DIO messages), for example in response to initial power-up of all the network devices in the LLN, and/or in response to recovery from a power outage in at least a portion of the LLN. Hence, in the case of initialization of the DAG network topology in response to an initial power-up or power outage recovery, the proactive transmission of DIS messages and/or DIO messages executed concurrently by hundreds or thousands of network devices can dramatically interfere with the reliable propagation of the root-originated DIO messages that are used to initialize the DAG network topology.

In addition, Section 18.2.1.1. of RFC 6550 permits a network device to "stay silent", waiting to receive DIO messages from the DODAG of interest, and not send any multicast DIO messages until the network device (i.e., "new network device") has joined a DODAG. However, even if the new network device has joined a DODAG, the DIO message transmitted by the new network device can still interfere with "higher" network devices that are closer to the DAG root within the DAG topology that are still attempting to transmit their respective DIO messages from "higher" in the DAG topology (i.e., having a lower rank and closer to the DAG root than the new network device); hence, the DIO transmitted by the "new" network device can interfere with the attempted transmission of DIO messages by respective "higher" network devices, resulting in an unbalanced propagation of DIO messages throughout the LLN network. Such unbalanced propagation of DIO messages can result in "churn", where network devices repeatedly change their preferred parent from a "lower" network device (having a higher rank and further from the DAG root) to a "higher" network device (having a lower rank and closer to the DAG root) as the DIO messages are propagated by the "higher" network devices. The resulting "churn" can cause oscillation in the propagation of DIO messages and can trigger network reformation for child nodes affected by the oscillation, resulting in substantially long delays (hours long) before the DAG topology can converge to a stable topology.

According to example embodiments, messages originated by a DAG root (e.g., root-originated DIO messages) can be evenly and reliably propagated throughout the data network, without interference by "lower" network devices, based on the "lower" network devices in the data network deferring to "higher" network devices (e.g., potential parent devices during initialization of a DAG network topology) in a data network. The deferring by the lower network devices guarantees that higher network devices closer to the DAG root can first attempt transmission of messages (e.g., DIS messages) before any "lower" network device attempts to transmit its own updated message (e.g., an updated DIS message) in response to receiving the message from a higher network device.

The example embodiments can ensure that network devices defer to higher network devices operating according to a prescribed transmission operation, for example according to a prescribed discovery operation such as attempted transmission of DIO messages according to the Trickle algorithm per Sec. 8.3 of RFC 6550. The network devices can defer to higher network devices based on setting a corresponding minimum contention interval "I_D" of the deferred transmission operation to be at least twice the selected minimum contention interval "I" used by any of the higher network devices.

The selected minimum contention interval "I" of the prescribed transmission operation can be randomly selected between an identified range that is greater or equal to a prescribed minimum contention interval "Imin", and less than or equal to a prescribed maximum contention interval "Imax", i.e., "Imin≤I≤Imax". Hence, the randomized position "t" of the prescribed transmission operation can be randomly selected between a second identified range that is greater or equal to the one-half the selected minimum contention interval "I/2" (where "/" represents a division operation) and less than the prescribed maximum contention interval "Imax", i.e., "I/2≤t<I"; hence, even if the selected minimum contention interval "I" equals the prescribed maximum contention interval "Imax" (i.e., "I=Imax"), the randomized position "t" remains less than the prescribed maximum contention interval "Imax" (i.e., "t<Imax"); hence, each network device executing the prescribed transmission operation (e.g., Trickle) can select the corresponding randomized position "t" to be before the prescribed maximum contention interval "Imax".

Hence, the deferred transmission operation of the example embodiments causes a network device to defer to any potential parent device attempting transmission of a corresponding message according to the prescribed transmission operation, as the minimum contention interval "I_D" of the deferred transmission operation can be set to at least twice the prescribed maximum contention interval "Imax" of the prescribed transmission operation, i.e., "I_D≥2*Imax", where "*" represents a multiplication operation.

A topological constant "L" also can be used to further refine the deferral of the network devices, relative to the prescribed maximum contention interval duration "Imax". A topological constant "L" can be set to an integer value of one or more, causing each network device to start its deferred transmission operation by setting its corresponding minimum contention interval "I_D" by multiplying the prescribed maximum contention interval "Imax" by an exponential multiple ($2^L$) having the topological constant (L) as the exponent, for example "I_D=Imax*$2^L$".

Hence, the example embodiments can ensure that the root-originated messages (e.g., DIO messages) can be evenly and reliably propagated throughout the data network, effectively forming concentric "waves" of root-originated messages that are propagated by "rings" of network devices based on their distance (e.g., hop count, rank, etc.) from the root, without any interference by "lower" network devices that are located in "lower" rings. The example embodiments can dramatically reduce the time required to form a DODAG in an LLN in cases where the root-originated messages are routing protocol messages such as DIO messages; the example embodiments also can substantially reduce the time to propagate any root-originated message throughout the DODAG.

FIG. 1A illustrates an example data network 10 comprising multiple network devices 12 configured for establishing a tree-based network topology, for example a Directed Acyclic Graph (DAG) or a Destination Ordered DAG (DODAG), according to an example embodiment. Each of the network devices (e.g., "Root", "A" through "O") 12 can be configured for forming a DAG network topology via wired or wireless data links 14, for example according to RPL as specified in the IETF RFC 6550, including executing a prescribed transmission operation such as the Trickle algorithm according to RFC 6206.

Although only the network devices "Root", "B", and "D", and "J" are labeled with the reference numeral "12" in FIGS. 1A-1E to avoid cluttering in the Figures, it should be apparent that all the network devices "Root" and "A" through "O" are allocated the reference numeral "12" for purposes of the description herein. Further, it should be apparent that all the network devices "Root" and "A" through "O" 12 are configured for establishing wired or wireless data links 14 (illustrated as curved lines radiating from each device 12), even though only the wireless data links for the network devices "Root" and "J" 12 are labeled with the reference numeral "14" to avoid cluttering in the Figures.

Each of the network devices 12 are configured for executing the prescribed transmission operation (e.g., Trickle) for establishing a selected minimum contention interval "I" (16r of FIG. 1) within a range of a prescribed minimum contention interval (e.g., "Imin" of RFC 6206) and a prescribed maximum contention interval (e.g., "Imax" of RFC 6206), i.e., "Imin≤I≤Imax"; each of the network devices also can select a randomized position "t" (18r of FIG. 1), i.e., "I/2≤t<I", where the corresponding network device 12 must wait at least the first half of the selected minimum contention interval "I" 16 (illustrated with hashed lines) before attempting transmission at the randomized position "t" 18 within the second half of the selected minimum contention interval "I" 16, and where the corresponding network device 12 can transmit only if its corresponding redundancy counter "c" is less than a prescribed redundancy constant "k", described in RFC 6206.

As illustrated in FIG. 1, the root network device "root" 12 can be configured (e.g., by a network administrator) for identifying itself as the DAG root to initiate transmission of its DIO message 20r (e.g., at time t=t0=0), for example during initialization of the DAG network topology after initial power-up or as part of a recovery operation following a power outage. As described in detail in RFC 6550, the DIO message 20r can specify its identity (e.g., IPv6 address), that the network device 12r transmitting the DIO message 20r is the root of the DAG network topology, and a corresponding rank (e.g., rankRoot=1) of the root network device 12r, where a lower rank value indicates a distance closer to the root network device 12r and a higher rank value indicates a distance further to the root network device 12r.

Each DIO message 20 also can optionally specify a "ring" identifier that specifies a relative position of the transmitting network device 12 within the DAG network topology, hence the DIO message 20r output by the DAG root 12 can specify a ring identifier of "Ring1" to specify that the corresponding DIO message 20r is transmitted by a member of the first logical ring "Ring1" closest to the DAG root device 12. The ring identifier can be prescribed for each network device (e.g., set in each network device 12 by a network administrator), or alternately the non-root network devices "A" through "O" 12 can choose their root identifier based on comparing their relative ranks or rank ranges, described below.

As described in further detail below, each of the network devices "A", "B", and "C" are allocated higher rank values relative to the root (e.g., rankA=140 for network device "A", rankB=130 for network device "B", rankC=180 for network device "C"). Hence, the network devices "A", "B", and "C" receiving the DIO message 20r within the transmission range 22r of the DAG root device 12 each can determine that the received DIO message 20r is from a network device that is "closer" to the DAG root device 12, and in response start a deferred transmission operation (44 of FIG. 3) that defers to any prescribed transmission operation (42 of FIG. 3) by setting a corresponding minimum contention interval "I_D" 24 of the deferred transmission operation (also referred to herein as the "deferred minimum contention interval") to be at least twice the selected minimum contention interval "I" 16 used by any of the higher network devices. Hence any network device 12, in response to detecting a DIO message 20 is received from a higher device that is closer to the DAG root device 12, can start a deferred transmission by setting its corresponding deferred minimum contention interval "I_D" 24 to at least twice the selected minimum contention interval "I" 16, ensuring that the network device 12 does not interfere with an attempted transmission by a higher network device.

Figure 1B:
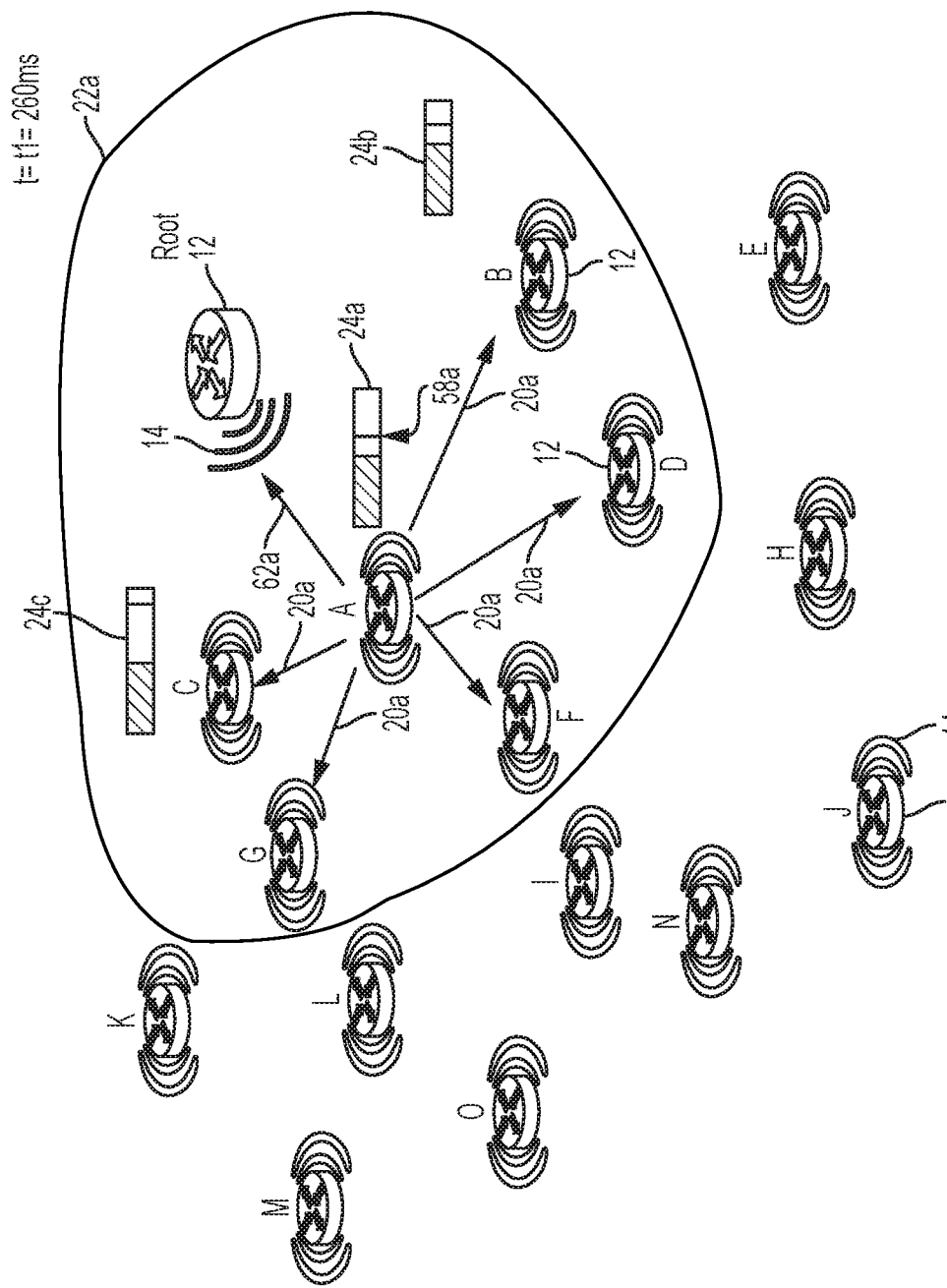
Figure 1C:
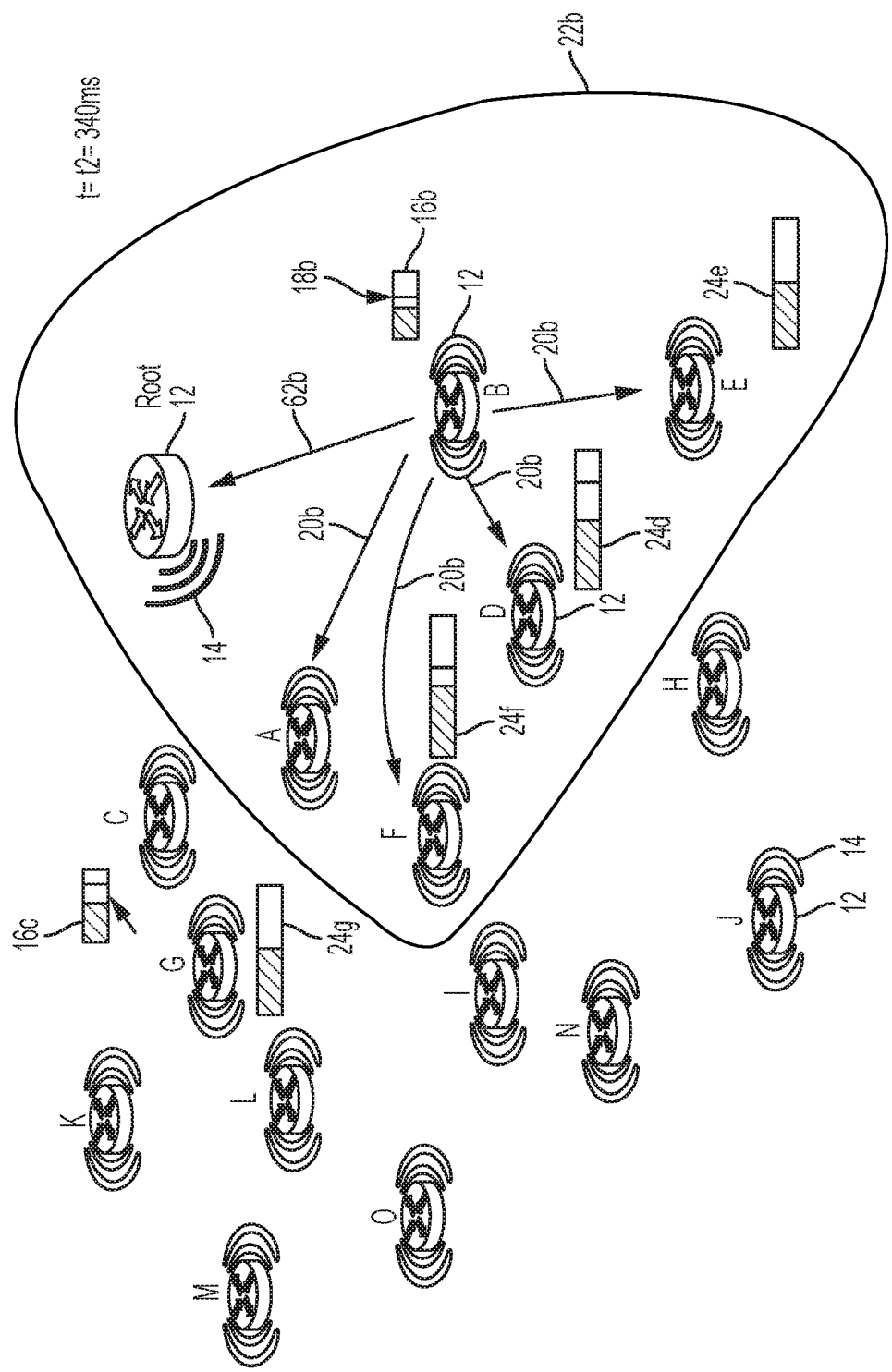
Figure 1D:
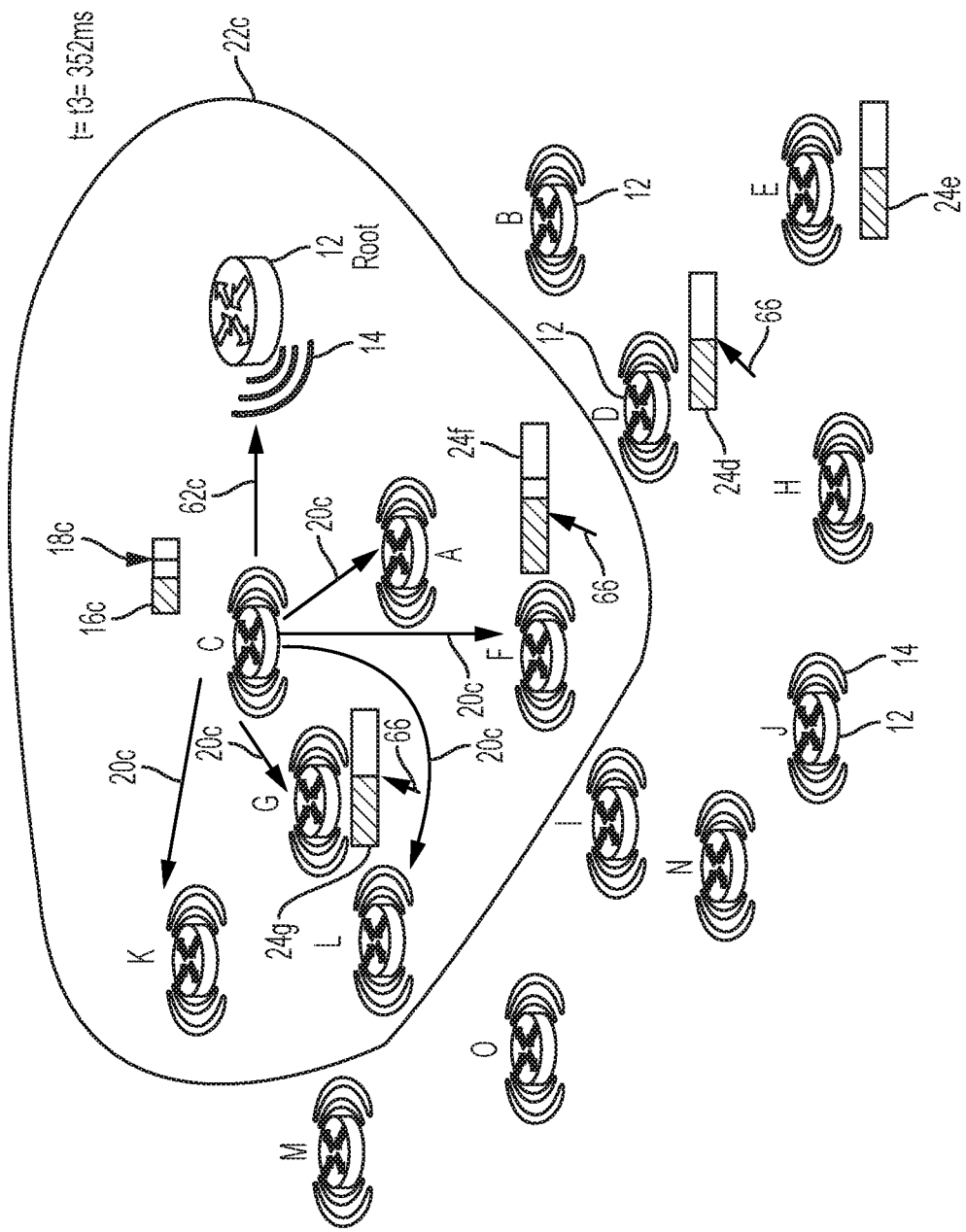
Figure 1E:
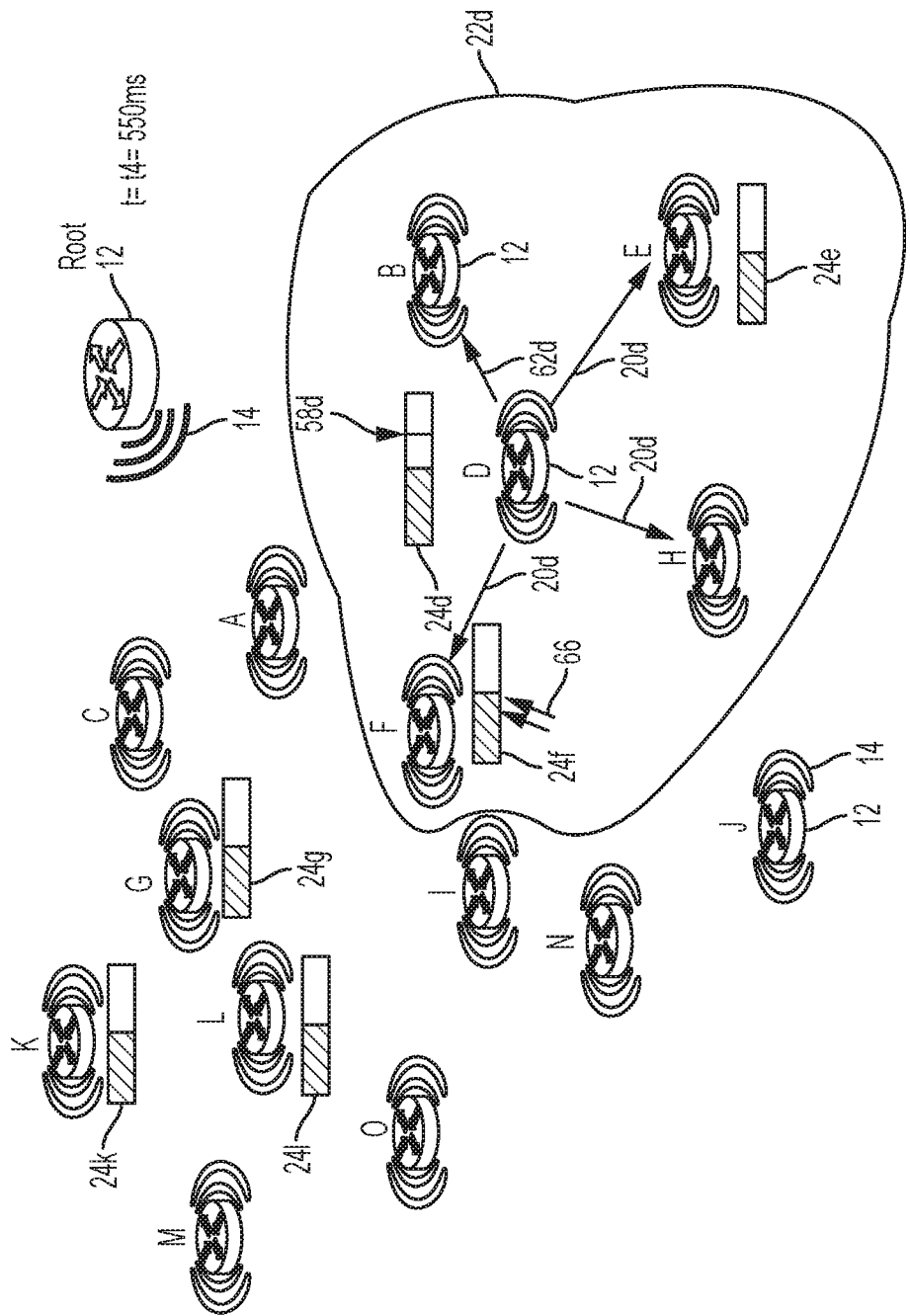
Figure 2:
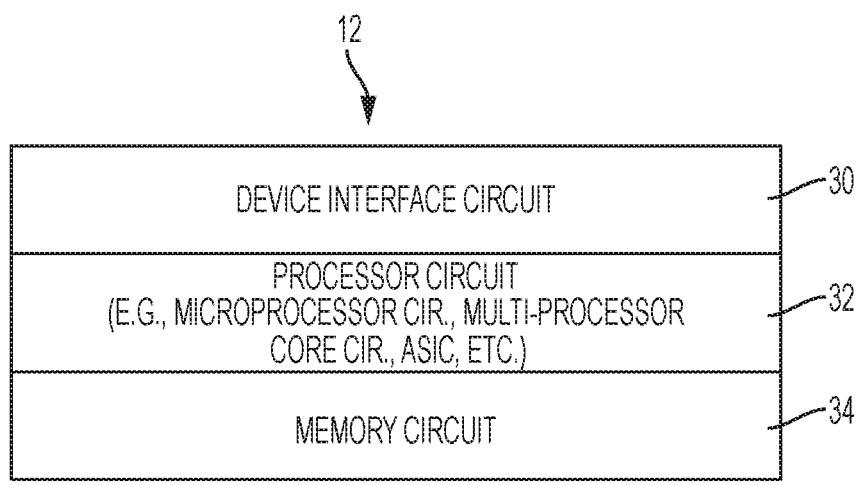
FIG. 2 illustrates an example implementation of any one of the network devices of FIG. 1, according to an example embodiment.

FIG. 2 illustrates an example implementation of any one of the network devices 12 of FIGS. 1A-1E, according to an example embodiment. Each apparatus 12 is a physical machine (i.e., a hardware device) configured for implementing network communications with other physical machines 12 via the data network 10. The term "configured for" or "configured to" as used herein with respect to a specified operation refers to a device and/or machine that is physically constructed and arranged to perform the specified operation.

Each apparatus 12 can include a device interface circuit 30, a processor circuit 32, and a memory circuit 34. Each apparatus also can include power supply circuitry for receiving power from an external power source, and a battery that enables short-term operations, for example backup operations in response to a detected power outage by the power sourcer. The device interface circuit 30 can include one or more distinct physical layer transceivers for communication with any one of the other devices 12; the device interface circuit 30 also can include an IEEE based Ethernet transceiver for communications with the devices of FIG. 1 via any type of data link (e.g., a wired or wireless link, an optical link, etc.). The processor circuit 32 can be configured for executing any of the operations described herein, and the memory circuit 34 can be configured for storing any data or data packets as described herein.

Any of the disclosed circuits of the devices 12 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 3:
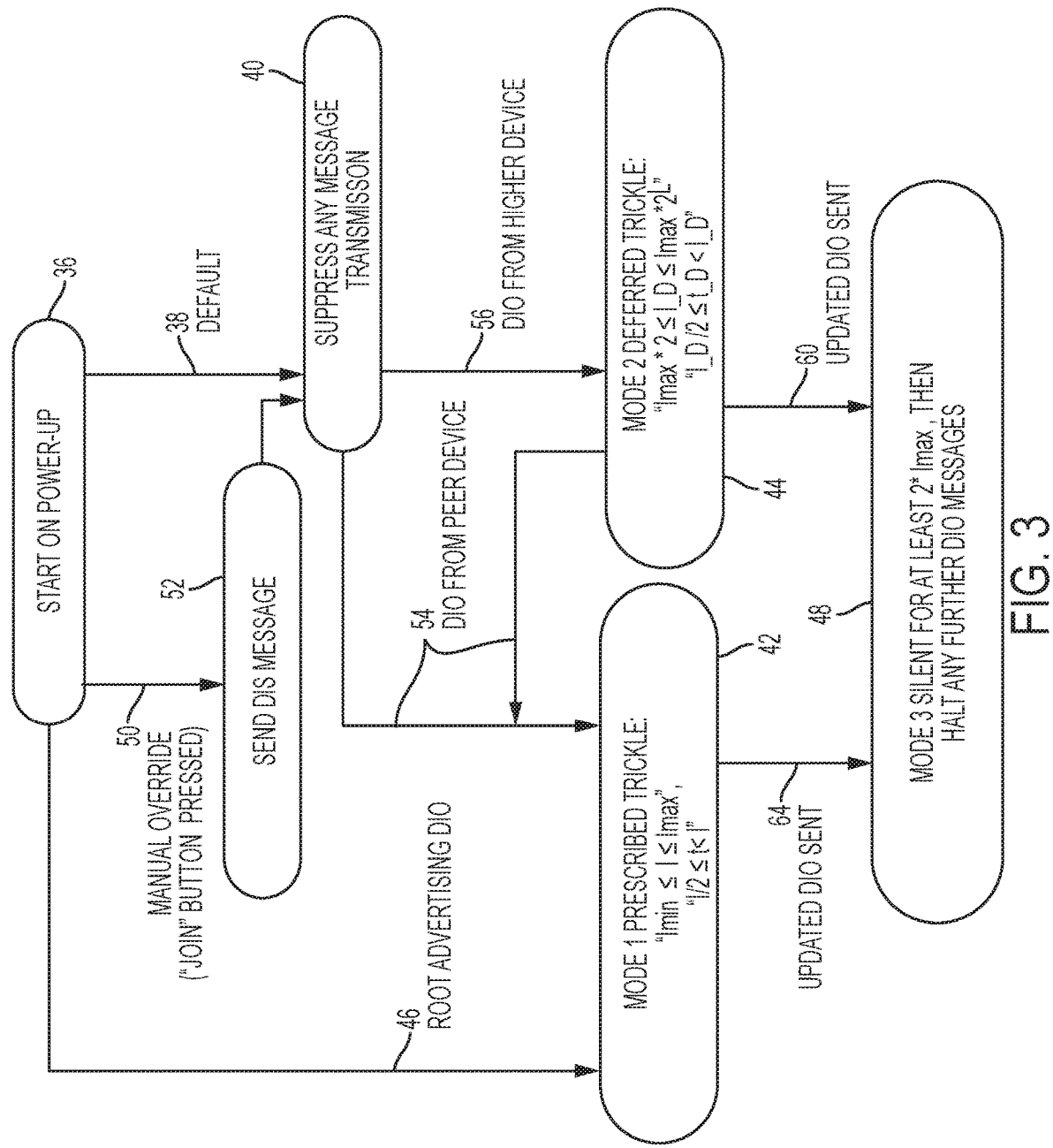
FIG. 3 illustrates an example state diagram executed by the non-root RPL network devices summarizing execution of the deferred transmission operations of FIGS. 1A-1E, according to an example embodiment.
Figure 4A:
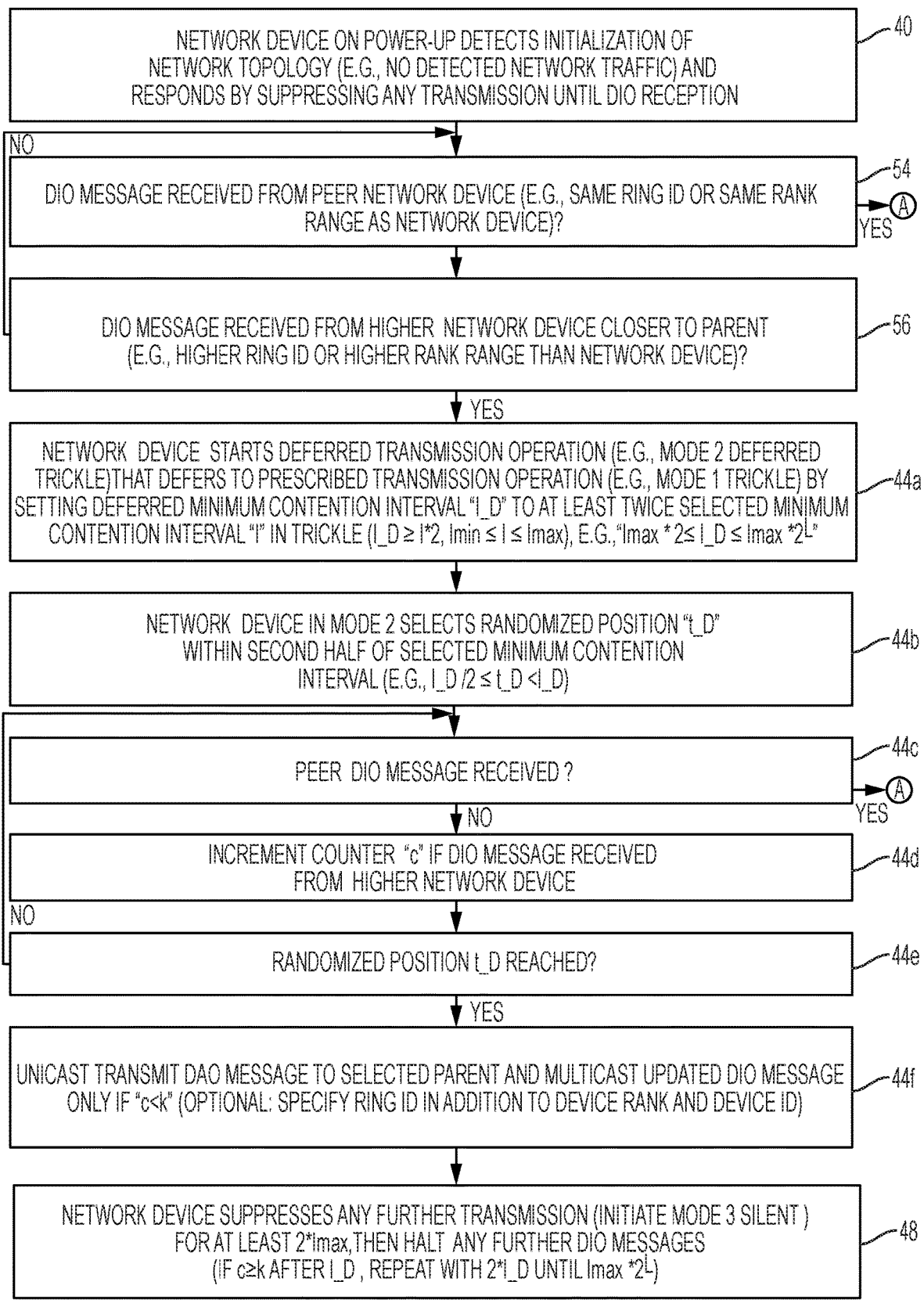
FIGS. 4A and 4B are diagrams illustrating a method of executing the deferred transmission operations of FIGS. 1A-1E, according to an example embodiment.
Figure 4B:
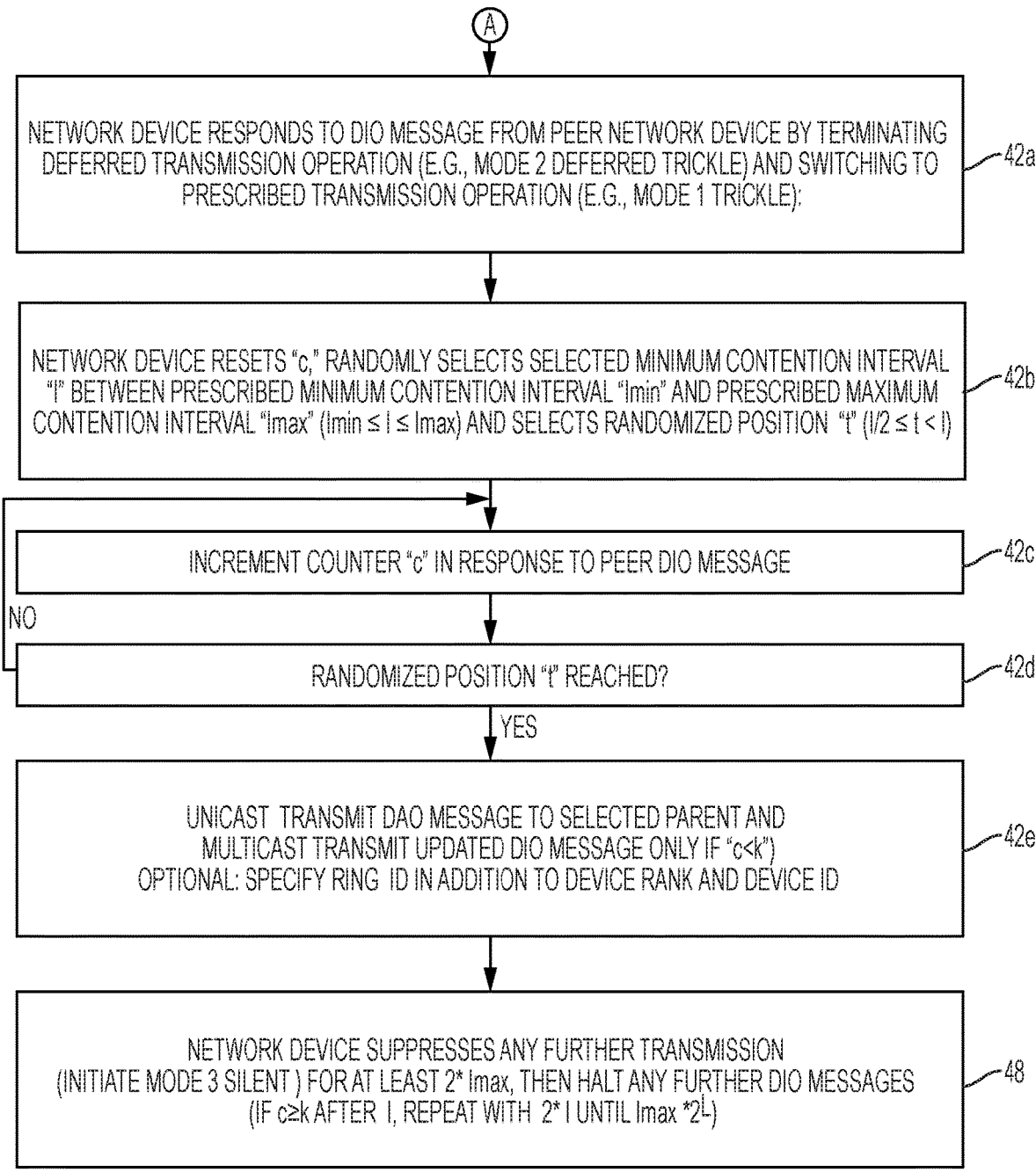

FIG. 3 illustrates an example state diagram executed by the non-root RPL network devices summarizing execution of the deferred transmission operations of FIGS. 1A-1E, according to an example embodiment. FIGS. 4A and 4B are diagrams illustrating a method of executing the deferred transmission operations of FIGS. 1A-1E, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

In one embodiment, each network device 12 can be configured for storing in its memory circuit 34 prescribed settings for executing the mode 1 (Trickle) operation 42, including the prescribed minimum contention interval "Imin" (e.g., "Imin=100 ms"), the prescribed maximum contention interval "Imax" (e.g., "Imax=200 ms"), and the prescribed redundancy constant "k" (e.g., "k=2"); each network device 12 also is configured for storing the dynamic variables used during execution of the mode 1 (Trickle) operation 42, including the corresponding selected minimum contention interval "I" 16, the corresponding randomized position "t" 18, and the corresponding counter value "c". The prescribed settings for executing the mode 1 (Trickle) operation 42 can be set, for example, by an administrator or field technician during deployment of the network device 12. Each network device 12 also can be configured for storing in its memory circuit 34 any of the parameters and/or variables associated with the "mode 2" deferred transmission operation 44.

Referring to FIGS. 3 and 4A, each the processor circuit 32 of each network device 12 (except for the DAG root device 12) is configured for responding to a start state 36 upon power-up (e.g., initial power-up upon device activation or power loss recovery) by following a default setting 38 that causes each network device 12 (except for the DAG root device 12) to suppress in operation 40 the transmission of any message in the data network 10 until receiving a prescribed message (e.g., a DIO message 20) from a higher network device, described in detail below. For example, the network device 12 of each non-root network device (e.g., "A" through "O") 12 can detect in operation 40 of FIG. 4A that the DAG topology is under initialization, for example based on a determined absence of any data traffic in the data network 10 for at least a prescribed time interval equal to or longer than the prescribed maximum contention interval "Imax", and in response suppress in operation 40 any transmission prior to initiation of any one of the prescribed transmission operation (also referred to as "mode 1", e.g., Trickle according to RFC 6206) 42, or the deferred transmission operation 44 as described herein.

Two exceptions to the non-root default state 38 of entering the non-root suppression state 40 is the DAG root device 12 which can respond to identifying at event 46 that it has a DIO message 20r to transmit by initiating the mode 1 (Trickle) operation 42, and transmitting its DIO message 20r at the selected randomized position "t" 18r, illustrated in FIG. 1A; as described in further detail, the DAG root device 12 can respond to transmission of its DIO message 20r by entering a "mode 3" (i.e., "silent" mode) operation 48 that suppresses any further transmissions for at least twice the maximum prescribed contention interval "Imax", followed by suppressing any further transmissions of DIO messages 20r (unless routing operations are required under RFC 6550).

The second exception to the non-root default state 38 of entering the non-root suppression state 40 can be a manual override operation 50, for example an installer pushing a "join" button on a newly-installed network device 12 to cause the newly-installed network device 12 to output in operation 52 a DIS message into an existing DAG topology. However, after the single transmission of the DIS message in operation 52 the newly-installed network device 12 enters the non-root suppression state 40 as described previously.

As illustrated in FIG. 1A, the DAG root device 12 can transmit its DIO message 20r at the randomized position "t" 18r (e.g. at time t=t0=0 coinciding with the randomized position "t" 18r) within the second half of its selected minimum contention interval "I" 16. Each of the non-root network devices "A" through "O" 12 are in the non-root suppression state 40 at time "t=0" associated with the transmission time of the DIO message 20r. Hence, each of the neighboring network devices "A", "B", and "C" 12 within the transmission range 22r of the DAG root device 12 can respond to reception of the DIO message 20 by first determining in operation 54 whether the received DIO message 20 is from a peer network device. Each network device 12 can be configured for storing in its memory circuit 34 its "rank" within the DAG: each network device 12 can decide whether to attach to a potential parent device advertising a DIO message 20 based on whether the corresponding DIO message 20 specifies that the potential parent device has a rank value that is lower than the corresponding rank value stored in the memory circuit 34. A lower rank value indicates a distance closer to the root network device 12r and a higher rank value indicates a distance further to the root network device 12r, hence generally a network device 12 will chose a potential parent device that advertises a lower rank value indicating it is closer to the DAG root device 12.

According to an example embodiment, the DIO message 20r received in operation 54 can optionally specify a ring identifier of "Ring1" to specify that the corresponding DIO message 20r is transmitted by a member of the first logical ring "Ring1" owned by (i.e., closest to) the DAG root device 12. Each of the network devices "A", "B", and "C" 12 can be allocated (e.g., by a network administrator or based on a previously-cached calculation) a ring identifier of "Ring2" that is stored in its corresponding memory circuit 34, indicating that the corresponding network device 12 wants to be a member of a second propagation ring of DIOs initiated by a child of the DAG root device 12; in other words, a first-hop child network device (e.g., "A", "B", and/or "C") of the DAG root device 12 can be considered a child of the first logical ring "Ring1" and a member of a second logical ring "Ring2" in response to receiving the DIO message 20r specifying the first logical ring "Ring1". Hence, any first-hop child (e.g., "A", "B", and/or "C") of the DAG root device 12 stores in its memory circuit 34 a corresponding ring identifier of "Ring2" (as a child of "Ring1"). The ring identifier also enables each network device 12 to determine whether a received DIO message 20 is from advertising network device is a potential parent network device that is closer to the network device 12 (based on the potential parent network device advertising a lower ring identifier), or whether the advertising network device is a peer network device that is at substantially the same depth in the DAG (based on the advertising network device specifying the same ring identifier as stored in the receiving network device).

In an alternate embodiment, since each of the network devices are allocated rank values, the processor circuit 32 of each network device 12 receiving a DIO message 20 can determine the relative "ring" position based on associating the rank advertised in the received DIO message 20 with one of a peer class of network devices or a higher class of network devices, where the higher class includes a first prescribed range values (e.g., "Ring1" class for rank range 1-100), and the peer class includes a second prescribed range of rank values that is increased relative to the first prescribed range (e.g., "Ring2" class for rank range 101-200). For example, the DAG root device 12 can be allocated "Ring1" for rank ranges 1-100, and non-root network devices can be allocated any one of "Ring2" for rank ranges 101-200, "Ring3" for rank ranges 201-300, "Ring4" for rank ranges 301-400, etc. As described previously, each of the network devices "A", "B", and "C" are allocated higher rank values relative to the root (e.g., rankA=140 for network device "A", rankB=130 for network device "B", rankC=180 for network device "C").

Hence, the device interface circuit 30 of each of the network devices "A", "B", and "C", within the transmission range 22r of the DAG root device 12, are configured for receiving the DIO message 20r at time "t=1" of FIG. 1A. The processor circuit 32 of each the network devices "A", "B", and "C" can determine in operation 54 that the received DIO message 20r is not from a peer network device in operation 54 (either because the advertised "Ring1" is a lower ring identifier indicating a higher network device than the "Ring2" identifier used by the network devices "A", "B", or C", or because the advertised "rankRoot=1" is in the first prescribed range of "Ring 1" which is lower than the second prescribed class range "Ring2" for which the network devices A, B, and C belong).

Hence, processor circuit 32 of each the network devices "A", "B", and "C" can determine in operation 56 that the DIO message 20r is from a network device that is "closer" to the DAG root device 12 (in this case, is from the network device 12 itself). The processor circuit 32 of each the network devices "A", "B", and "C" in operation 44 of FIG. 3 and 44a of FIG. 4A in response to detecting the DIO message 20 is from a higher network device can start the "mode 2" deferred transmission operation 44 that defers to any prescribed transmission operation (42 of FIG. 3) by setting in operation 44a a corresponding deferred minimum contention interval "I_D" 24 to be at least twice the selected minimum contention interval "I" 16 used by any of the higher network devices. Since the selected minimum contention interval "I" 16 can have a range of "Imin≤I≤Imax", the deferred minimum contention interval "I_D" 24 can be set to at least twice the prescribed maximum contention interval "Imax" ("I_D≥Imax*2") to ensure that the network device absolutely defers to any higher network device executing the mode 1 (Trickle) operation 42. The processor circuit 32 of each non-root network device 12 also can be configured for setting a relative maximum deferred contention interval based on a nonzero topological constant "L" set by an administrator, based on the topological characteristics of the data network 10 and/or the DAG that is initialized. For example a RPL network formed from a string of lighting elements along a highway can have a one-dimensional (linear) topology, i.e., each network device has no more than one child, hence the chance of interference is minimal such that the topological constant can be set to "L=1", i.e., the deferred minimum contention interval "I_D" 24 can be set at "I_D=2*Imax"; in more complex network topologies, e.g., 2-dimensional or 3-dimensional topologies where non-root network devices 12 can have multiple children devices, the topological constant can have a value greater than one, such that the deferred minimum contention interval "I_D" 24 can be chosen by one of the non-root network devices from a range of "Imax*2≤I_D≤Imax*2$^L$".

Hence, the processor circuit 32 of each of the network devices "A", "B", and "C" can respond to the DIO message 20r by selecting in operation 44a a corresponding deferred minimum contention interval "I_D" that is at least twice the prescribed maximum contention interval (e.g., "Imax=200 milliseconds (ms))", for example the network device "A" can chose "I_D=400 milliseconds (ms)" 24a, the network device "B" can choose "I_D=600 ms" 24b, and the network device C" can choose "I_D=700 ms" 24c, illustrated in FIG. 1A as starting at time "t=0". The processor circuit 32 of each of the network devices "A", "B", and "C" in operation 44b can select a randomized deferred position "t_D" 58 that is after a first half of the deferred minimum contention interval "I_D" 24 (indicated by the hashed lines) and within a randomized position within the second half of the deferred minimum contention interval "I_D" 24. For example, the processor circuit 32 of the network device "A" can select the randomized deferred position "t_D=260 ms" (58a of FIG. 1B), the processor circuit 32 of the network device "B" can select the randomized deferred position "t_D=450 ms", and the processor circuit 32 of the network device "C" can select the randomized deferred position "t_D=460 ms".

Hence, the network device "A" in the deferred transmission operation (mode 2) 44 at the randomized deferred position "t_D=260 ms" 58a after time "t=0" (i.e., receiving the DIO message 20r at time "t=0" in FIG. 1A) in operation 44e can determine that it has not received any other "peer DIO message" (i.e., a DIO message 20 from a peer network device as described with respect to operation 54) in operation 44c, it has not needed to increment its counter "c" in operation 55d in response to receiving another DIO message 20 from a "Ring1" higher network device. Hence, the processor circuit 32 of the network device "A" 12 can determine in operation 44f that its counter "c=0" is less than the redundancy constant "k=2", and in response the processor circuit 32 of the network device "A" 12 in operation 44f (event 60 of FIG. 3) can transmit its updated DIO message 20a, illustrated in FIG. 1B at time "t=t1=260 ms". The updated DIO message 20a output by the device interface circuit 30 of the network device "A" 12 can specify its device identifier (e.g., "A") the DAG identifier (e.g., identifier of the DAG root device 12), the rank of the transmitting network device "A", and optionally the ring identifier "Ring2". The processor circuit 32 of the network device "A"

also can cause the device interface circuit 30 to output a destination advertisement object (DAO) 62a to the DAG root device 12, for example according to RFC 6550.

In response to the network device "A" 12 transmitting its DIO message 20a at event 60 and its DAO message 62a, the processor circuit 32 of the network device "A" 12 executes its mode 3 (silent) operation 48 that causes the network device "A" to suppress any further transmission for at least twice the prescribed maximum contention interval "Imax" (e.g., at least 800 ms), with no further transmission of a DIO message 20a.

As illustrated in FIG. 1B, the network devices "B", "C", "D", "F", and "G" 12 receive the DIO message 20a that was transmitted within the transmission range 22a at time "t=t1=260 ms". Each of the network devices "B" and "C" 12, in response to detecting in operation 44c that the DIO message 20a is from a peer network device "A" (either by identifying network device "A" belongs to the same "Ring 2" or the same ring range based on its corresponding rank 140), can respond to event 54 (FIG. 3) by terminating the deferred transmission operation (mode 2) 44 and starting execution of the mode 1 (Trickle) operation 42 of FIG. 3, starting with the operation 42a of FIG. 4B. For example, network device "B" in operation 42b at event "t1=260 ms" can select its selected minimum contention interval "I" 16 as "I=120 ms" 16b, and the network device "C" in operation 42b at event "t1=260 ms" can select its selected minimum contention interval "I" 16 as "I=180 ms" 16c, illustrated in FIG. 1C. The network device "B" in operation 42b at event "t1=260 ms" also can select its randomized position "t" 18 as "t=80" 18b (FIG. 1C), and the network device "C" in operation 42b at event "t1=260 ms" can select its randomized position "t" 18 as "t=92 ms" 18c, illustrated in FIG. 1D. Hence, the network devices "B" and "C" can initiate their respective trickle timers, starting at time "t1=260 ms", and wait until the respective randomized positions of "t=80 ms" 18b and "t=92 ms" 18c.

Assume the network device "D" is allocated the rank "rankD=220" and optionally the ring value "Ring3"; the network device "E" is allocated the rank "rankE=275" and optionally the ring value "Ring3"; the network device "F" is allocated the rank "rankF=225" and optionally the ring value "Ring3"; the network device "G" is allocated the rank "rankG=210". Hence, in response to the network devices "D", "F", and "G" 12 receiving the DIO message 20a while in their non-root suppression state 40, the processor circuit 32 of each of the network devices "D", "F", and "G" 12 in operation 56 can determine that the DIO message 20a is from a higher network device based on the ring value "Ring2" and/or the advertised rank value "rankA=140" specified in the DIO message 20a. Hence, the processor circuit 32 of each network device "D", "F", and "G" 12 in operation 44 (44a of FIG. 4A) can select its corresponding deferred minimum contention interval "I_D" 24. For example the network device "D" can select the deferred minimum contention interval "I_D" 24 "I_D=500 ms" 24d (FIG. 1C), the network device "F" can select the deferred minimum contention interval "I_D" 24 "I_D=450 ms" 24f (FIG. 1C), and the network device "G" can select the deferred minimum contention interval "I_D" 24 "I_D=700 ms" 24g (FIG. 1C).

The processor circuit 32 of each network device "D", "F", and "G" 12 in operation 44b also can select its corresponding randomized deferred position "t_D" 58, for example the network device "D" can select the randomized deferred position "t_D" 58 "t_D=290 ms" 58d (FIG. 1E), the network device "F" can select the randomized deferred position "t_D" 58 "t_D=250 ms", and the network device "G" can select the randomized deferred position "t_D" 58 "t_D=650 ms".

Hence, at time "t=t1=260 ms", the device "A" completes its transmission of the DAO message 62a and the DIO message 20a and in response to completed transmission starts its trickle timer for the mode 3 (silent) operation 48 of at least "t=800 ms"; the device "B" (in "Ring2") has its trickle timer set for the corresponding randomized position "t=80 ms" 18b (FIG. 1C), the device "C" (in "Ring2") has its trickle timer set for the corresponding randomized position "t=92 ms" 18c (FIG. 1D), the device "D" (in "Ring3") has its trickle timer set for the corresponding randomized deferred position "t=t_D=290 ms" 58d (FIG. 1E), the device "F" (in "Ring3") has its trickle timer set for the corresponding randomized deferred position at "t=t_D=250 ms", and the device "G" (in "Ring3") has its trickle timer set for the corresponding randomized deferred position at "t=t_D=650 ms". Consequently, the network devices "D", "F", and "G" 12 (in "Ring 3") defer to the "higher" network devices "B" and "C" (in "Ring2").

Hence, the network device "B" in FIG. 1C operating in the mode 1 (Trickle) operation 42 can determine that, upon reaching its corresponding randomized position 18b at time "t=t2=340 ms" in operation 42d of FIG. 4B, it has not received any other "peer DIO message" (identifying the same ring identifier "Ring2" or identifying a same rank range "101-200") and therefore has not needed to increment its counter "c" in operation 42c. Hence, the processor circuit 32 of the network device "B" 12 can determine in operation 42e that its counter "c=0" is less than the redundancy constant "k=2", and in response the processor circuit 32 of the network device "B" 12 in operation 42e (event 64 of FIG. 3) can transmit its updated DIO message 20b, illustrated in FIG. 1C at time "t=t2=340 ms". The updated DIO message 20b output by the device interface circuit 30 of the network device "B" 12 can specify its device identifier (e.g., "B") the DAG identifier (e.g., identifier of the DAG root device 12), the rank of the transmitting network device "B" (e.g., rankB=130), and optionally the ring identifier "Ring2". The processor circuit 32 of the network device "B" also can cause the device interface circuit 30 to output a destination advertisement object (DAO) 62b to the DAG root device 12, for example according to RFC 6550.

In response to the network device "B" 12 transmitting its updated DIO message 20b at event 64 and its DAO message 62b, the processor circuit 32 of the network device "B" 12 executes its mode 3 (silent) operation 48 that causes the network device "B" to suppress any further transmission for at least twice the prescribed maximum contention interval "Imax", with no further transmission of a DIO message 20b.

As illustrated in FIG. 1C, the network devices "A", "D", "E", and "F" 12 receive the updated DIO message 20b that was transmitted within the transmission range 22b at time "t=t2=340 ms"; however, other network devices including the network devices "C" and "G" 12 do not detect the updated DIO message 20b because they are outside the transmission range 22b.

The network device "A" 12 remains in its mode 3 (silent) operation 48 in response to reception of the DIO message 20b, hence the network device "A" 12 in operation 48 suppresses any transmission in response to reception of the DIO message 20b at time "t=t2". The processor circuit 32 of the network device "D" (having rank "rankD=220" and/or allocated to the ring value "Ring3") 12 responds to reception of the DIO message 20b during its deferred transmission operation (mode 2) 44 by determining the DIO message 20b is from a higher network device "B" (based on the corresponding DIO message 20b advertising the rank "rankB=130" and optionally the ring value "Ring2"), and in response incrementing its corresponding counter to "c=1" in operation 44d of FIG. 4A (66 of FIG. 1D). The processor circuit 32 of the network device "F" (having rank "rankF=225" and/or allocated to the ring value "Ring3") 12 also responds to reception of the DIO message 20b during its deferred transmission operation (mode 2) 44 by determining the DIO message 20b is from a higher network device "B" (based on the corresponding DIO message 20b advertising the rank "rankB=130" and optionally the ring value "Ring2"), and in response incrementing its corresponding counter to "c=1" in operation 44d of FIG. 4A (66 of FIG. 1D).

The network device "E" 12 that is operating in its non-root suppression state 40 at time "t=t2" of FIG. 1C, can respond to detecting the DIO message 20b by determining in operation 56 of FIG. 4A that the DIO message 20b is from a higher network device based on the advertised rank value "rankB=130" (and optionally the advertised ring value "Ring2") specified in the DIO message 20b. Hence, the processor circuit 32 of the network device "E" in operation 44 of FIG. 3 (44a of FIG. 4A) can select its corresponding deferred minimum contention interval "I_D" 24, for example the network device "E" can select the deferred minimum contention interval "I_D" 24 "I_D=600 ms" 24e (FIG. 1C). The processor circuit 32 of the network device "E" in operation 44b also can select its corresponding randomized deferred position "t_D" 58, for example "t_D=550 ms".

Hence, at time "t=t2=340 ms" the device "A" (in "Ring2") has waited 80 ms within its 800 ms mode 3 (silent) operation 48 that started at time "t=t1=260 ms", the device "B" (in "Ring2") completes its transmission of the DAO message 62b and the DIO message 20b and in response to completed transmission starts its trickle timer for the mode 3 (silent) operation 48 of at least "t=800 ms"; the device "D" (in "Ring3") having operated for 80 ms of its 290 ms deferral in the deferred transmission operation (mode 2) 44 (that started at time "t=t1=260 ms") increments its counter to "c=1", and the device "F" (in "Ring3") having operated for 80 ms of its 250 ms deferral in the deferred transmission operation (mode 2) 44 (that started at time "t=t1=260 ms") increments its counter to "c=1"; and the device "E" (in "Ring3") has its trickle timer set for the corresponding randomized deferred position at "t=t_D=550 ms". Consequently, the network devices "D", "F", "E", and "G" 12 (in "Ring 3") defer to the "higher" network device "C" (in "Ring2") having waited 80 ms within its randomized position "t=92 ms" 18c that started at time "t=t1=260 ms".

Hence, the network device "C" in FIG. 1D operating in the mode 1 (Trickle) operation 42 can determine that, upon reaching its corresponding randomized position 18c at time "t=t3=352 ms" in operation 42d of FIG. 4B, it has not received any other "peer DIO message" (identifying the same ring identifier "Ring2" or identifying a same rank range "101-200") and therefore has not needed to increment its counter "c" in operation 42c. Hence, the processor circuit 32 of the network device "C" 12 can determine in operation 42e that its counter "c=0" is less than the redundancy constant "k=2", and in response the processor circuit 32 of the network device "C" 12 in operation 42e (event 64 of FIG. 3) can transmit its updated DIO message 20c, illustrated in FIG. 1C at time "t=t3=352 ms". The updated DIO message 20c output by the device interface circuit 30 of the network device "C" 12 can specify its device identifier (e.g., "C") the DAG identifier (e.g., identifier of the DAG root device 12), the rank of the transmitting network device "C" (e.g., rankC=180), and optionally the ring identifier "Ring2". The processor circuit 32 of the network device "C" also can cause the device interface circuit 30 to output a destination advertisement object (DAO) 62c to the DAG root device 12, for example according to RFC 6550. Hence, the DAG root network device 12r can establish downward routes for reaching the network devices "A", "B", and "C" based on the respective DAO messages 62a, 62b, and 62c.

In response to the network device "C" 12 transmitting its updated DIO message 20c at event 64 and its DAO message 62c, the processor circuit 32 of the network device "C" 12 executes its mode 3 (silent) operation 48 that causes the network device "C" to suppress any further transmission for at least twice the prescribed maximum contention interval "Imax", with no further transmission of a DIO message 20c.

As illustrated in FIG. 1D, the network devices "A", "F", "G", "K", and "L" 12 receive the updated DIO message 20c that was transmitted within the transmission range 22c at time "t=t3=352 ms"; however, other network devices including the network devices "B", "D", and "E" 12 do not detect the updated DIO message 20b because they are outside the transmission range 22c.

The network device "A" 12 remains in its mode 3 (silent) operation 48 in response to reception of the DIO message 20c, hence the network device "A" 12 in operation 48 suppresses any transmission in response to reception of the DIO message 20b at time "t=t3". The processor circuit 32 of the network device "F" (having rank "rankF=225" and/or allocated to the ring value "Ring3") 12 responds to reception of the DIO message 20c during its corresponding deferred transmission operation (mode 2) 44 by determining the DIO message 20c is from a higher network device "C" (based on the corresponding DIO message 20c advertising the rank "rankC=180" and optionally the ring value "Ring2"), and in response increments the corresponding counter to "c=2" in operation 44d of FIG. 4A (66 of FIG. 1E): as described in FIG. 3 with respect to operation 44 and FIG. 4 with respect to operation 44f, since the counter value equals the redundancy constant "c=k=2" the network device "F" is suppressed from any transmissions during its deferred minimum contention interval "I_D" 24f. The processor circuit 32 of the network device "G" the network device "G" (having rank "rankG=210" and/or allocated to the ring value "Ring3") 12 also responds to reception of the DIO message 20c during its deferred transmission operation (mode 2) 44 by determining the DIO message 20c is from a higher network device "C" (based on the corresponding DIO message 20c advertising the rank "rankC=180" and optionally the ring value "Ring2"), and in response incrementing its corresponding counter to "c=1" in operation 44d of FIG. 4A (66 of FIG. 1D).

The network devices "K" and "L" 12 that are operating in their respective non-root suppression states 40 at time "t=t3" of FIG. 1D each can respond to detecting the DIO message 20c by determining in operation 56 of FIG. 4A that the DIO message 20c is from a higher network device based on the advertised rank value "rankC=180" (and optionally the advertised ring value "Ring2") specified in the DIO message 20c. Hence, the corresponding processor circuit 32 of each of the network devices "K" and "L" in operation 44 of FIG. 3 (44a of FIG. 4A) can select its corresponding deferred minimum contention interval "I_D" 24: for example network device "K" can select the deferred minimum contention interval "I_D" 24 "I_D=600 ms" 24k (FIG. 1E), and in operation 44b can select its corresponding randomized deferred position "t_D" 58, for example "t_D=650 ms"; the network device "L" can select the deferred minimum contention interval "I_D" 24 "I_D=400 ms" 241 (FIG. 1E), and in operation 44b can select its corresponding randomized deferred position "t_D" 58, for example "t_D=250 ms".

Hence, at time "t=t3=352 ms" the device "A" (in "Ring2") has waited 92 ms within its 800 ms mode 3 (silent) operation 48 that started at time "t=t1=260 ms"; the device "B" (in "Ring2") has waited 12 ms within its 800 ms mode 3 (silent) operation 48 that started at time "t=t2=340 ms"; the device "C" (in "Ring2") completes its transmission of the DAO message 62c and the DIO message 20c and in response to completed transmission starts its trickle timer for the mode 3 (silent) operation 48 of at least "t=800 ms"; the device "D" (in "Ring3") having operated for 92 ms of its 290 ms deferral in the deferred transmission operation (mode 2) 44 (that started at time "t=t1=260 ms") maintains its counter at "c=1"; the device "E" (in "Ring3") having operated for 12 ms of its 550 ms deferral in the deferred transmission operation (mode 2) 44 (that started at time=t2=340 ms) maintains its counter at "c=0"; the device "F" (in "Ring3") having operated for 92 ms of its 250 ms deferral in the deferred transmission operation (mode 2) 44 (that started at time "t=t1=260 ms") is suppressed from transmissions during its deferred minimum contention interval "I_D" 24f in response to its counter "c=2" having reached the redundancy constant "k=2"; the network device "G" (in "Ring3") having operated for 92 ms of its 650 ms deferral in the deferred transmission operation (mode 2) 44 (that started at time "t=t1=260 ms") increments its counter to "c=1"; the device "K" (in "Ring3") has its trickle timer set for the corresponding randomized deferred position at "t=t_D=650 ms"; and the device "L" (in "Ring3") has its trickle timer set for the corresponding randomized deferred position at "t=t_D=250 ms".

Consequently, the network devices "A", "B", "C" 12 (in "Ring2") have completed transmission of their respective DIO message 20s and enter the mode 3 (silent) operation 48, enabling the "Ring3" network devices (e.g., "D", "E", "G", "K", and "L") to contend for transmission of the next DIO message 20. As noted previously, the network device "F" is suppressed from any transmission during its corresponding deferred minimum contention interval "I_D" 24f in response to its counter having reached the redundancy constant "c=k=2"; hence, the network device "F" 12 is suppressed from transmission at time "t=510 ms", which is the expiration of its randomized deferred position "t_D=250" that was initiated at time "t=t1=260 ms".

Hence, the network device "D" in FIG. 1E operating in the deferred transmission operation (mode 2) 44 can determine that, upon reaching its corresponding randomized position 58d at time "t=t4=550 ms" in operation 44e, it has not received any other "peer DIO message" (i.e., a DIO message 20 from a peer network device as described with respect to operation 54) in operation 44c, it has incremented its counter "c" to "c=1" in operation 55d in response to receiving the updated DIO message 20b from the "Ring1" higher network device "B". Hence, the processor circuit 32 of the network device "D" 12 can determine in operation 44f that its counter "c=1" is less than the redundancy constant "k=2", and in response the processor circuit 32 of the network device "D" 12 in operation 44f (event 60 of FIG. 3) can transmit its updated DIO message 20d, illustrated in FIG. 1E at time "t=t4=550 ms". The updated DIO message 20d output by the device interface circuit 30 of the network device "D" 12 can specify its device identifier (e.g., "D") the DAG identifier (e.g., identifier of the DAG root device 12), the rank ("rankD=220") of the transmitting network device "D", and optionally the ring identifier "Ring3". The processor circuit 32 of the network device "D" also can cause the device interface circuit 30 to output a destination advertisement object (DAO) 62d to the network device "B" 12, for example according to RFC 6550.

In response to the network device "D" 12 transmitting its DIO message 20d at event 60 and its DAO message 62d, the processor circuit 32 of the network device "D" 12 executes its mode 3 (silent) operation 48 that causes the network device "D" to suppress any further transmission for at least twice the prescribed maximum contention interval "Imax" (e.g., at least 800 ms), with no further transmission of a DIO message 20d. As illustrated in FIG. 1E, the network devices "E", "F", and "H" 12 receive the updated DIO message 20b that was transmitted within the transmission range 22d at time "t=t4=550 ms"

The network device "B" 12 remains in its mode 3 (silent) operation 48 in response to reception of the DIO message 20d, hence the network device "B" 12 in operation 48 suppresses any transmission in response to reception of the DIO message 20d at time "t=t4". The processor circuit 32 of each of the network devices "E" and "F" operating in the deferred transmission operation (mode 2) 44 can detect from the received DIO message 20d that the DIO message 20d (specifying rank "rankD=220" and/or allocated to the ring value "Ring3") is from a peer network device "D", for example based on determining the network device "D" belongs to the same "Ring3" or the same rank range (201-300) based on its corresponding rank "rankD=220".

Hence, the processor circuit 32 of each of the network devices "E" and "F" can respond to the DIO message 20d at event 54 (FIG. 3) and operation 44c in operation 4A by terminating the deferred transmission operation (mode 2) 44 and starting execution of the mode 1 (Trickle) operation 42 of FIG. 3, starting with the operation 42a of FIG. 4B. For example, network device "E" in operation 42b at event can select its selected minimum contention interval "I" 16 as "I=150", and the network device "F" in operation 42b can select its selected minimum contention interval "I" 16 as "I=124 ms"; the network device "E" in operation 42b also can select its randomized position "t" 18 as "t=150", and the network device "F" in operation 42b can select its randomized position "t" 18 as "t=80 ms". Hence, the network devices "E" and "F" can initiate their respective trickle timers, starting at time "t4=550 ms", and wait until the respective randomized positions of "t=150 ms" and "t=80 ms" 18c.

Hence, the network devices "E" and "F" of "Ring3" can accelerate their negotiating of their respective DIO messages based on the completion of the "Ring2" propagation by the network devices "A", "B", and "C" 12 that are a single hop from the DAG root device 12, enabling the propagation of the next "ring" of DIO messages via the network devices associated with "Ring3".

The network device "H" 12 operating in its non-root suppression state 40 at time "t=t4" of FIG. 1E can respond to detecting the DIO message 20d by determining in operation 56 of FIG. 4A that the DIO message 20d is from a higher network device based on the advertised rank value "rankD=220" (and optionally the advertised ring value "Ring3") specified in the DIO message 20c, relative to its rank (e.g., "rankH=308") or ring identifier (e.g., network device "H" belongs to "Ring4"). Hence, the corresponding processor circuit 32 of the network device "H" in operation 44 of FIG. 3 (44a of FIG. 4A) can select its corresponding deferred minimum contention interval "I_D" 24, for example "I_D=420 ms", and in operation 44b can select its corresponding randomized deferred position "t_D" 58, for example "t_D=450 ms". Hence, the network device can start its deferred transmission operation (mode 2) 44 by deferring at least "I_D=420 ms" 58 from time "t=t4=550 ms", enabling the network devices "E" and "F" to attempt transmission using the prescribed transmission operation at the randomized positions "t=150 ms" and "t=80 ms" from "t=t4=550 ms", respectively.

Hence any network device 12, in response to detecting a DIO message 20 is received from a higher device that is closer to the DAG root device 12, can start a deferred transmission by setting its corresponding deferred minimum contention interval "I_D" 24 to at least twice the selected minimum contention interval "I" 16, ensuring that the network device 12 does not interfere with an attempted transmission by a higher network device.

Although only a subset of the network devices 12 in the Figures are illustrated as outputting a DIO message 20 to avoid cluttering in the Figures, it should be apparent that all the network devices "A" through "O" 12 can output a corresponding DIO message 20 and a corresponding DAO message.

According to example embodiments, transmission priority is granted by network devices in a directed acyclic graph to "higher" network devices that are closer to a root of the directed acyclic graph. The example embodiments enable the higher network device to obtain prioritized transmission of a data packet, followed by a silent period to minimize interference. The example embodiments also enable network devices to detect when they should begin claiming the higher priority for further transmission of the data packet to other network devices. Hence, the example embodiments a prioritization scheme for concentric transmissions in a data network, based on the relative "depth" of network devices in the network topology.

Figure 5A:
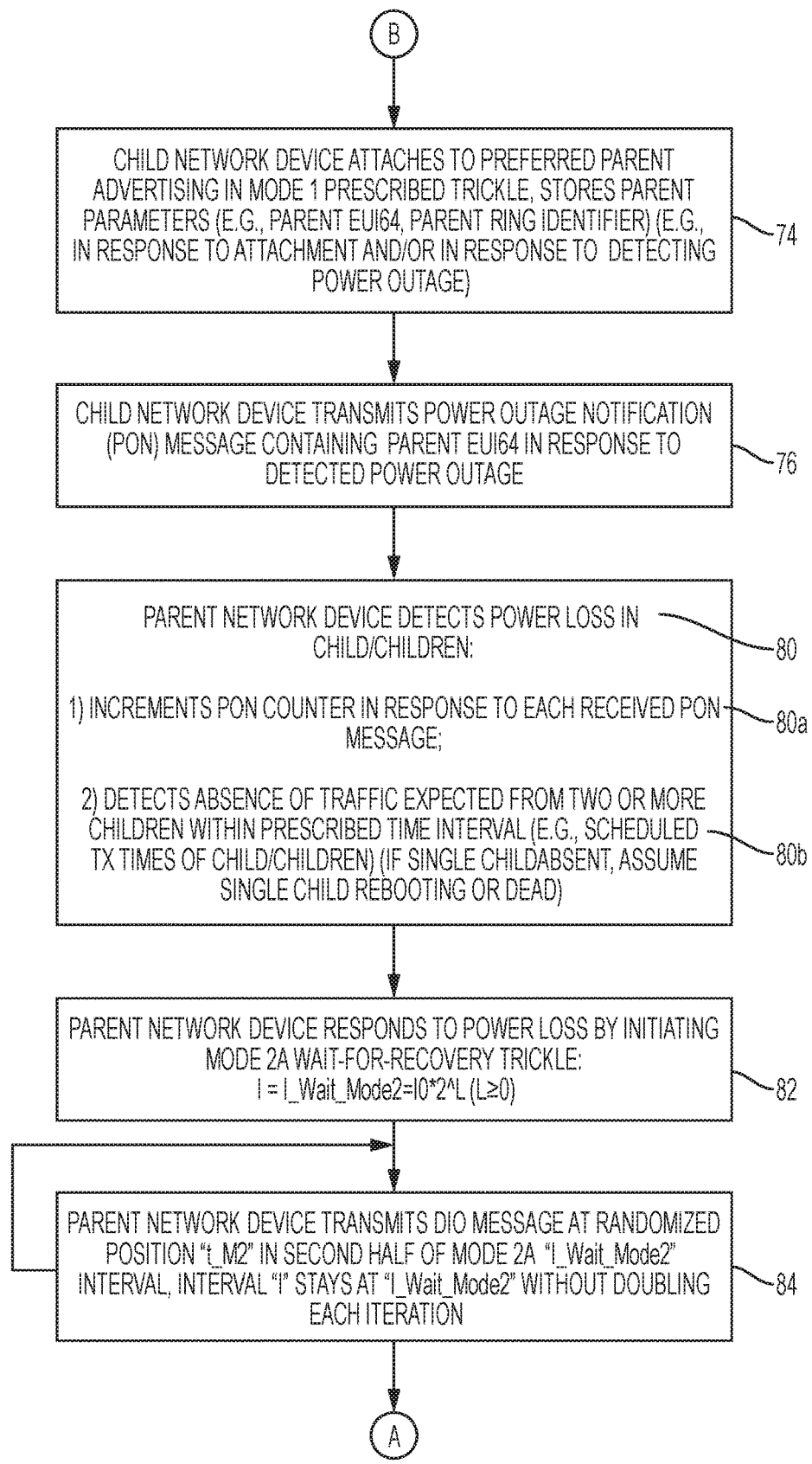
FIGS. 5A and 5B are diagrams illustrating a method of executing proactive reform of a directed acyclic graph (DAG) by suppressing child transmissions and accelerating parent advertisements, according to an example embodiment.
Figure 5B:
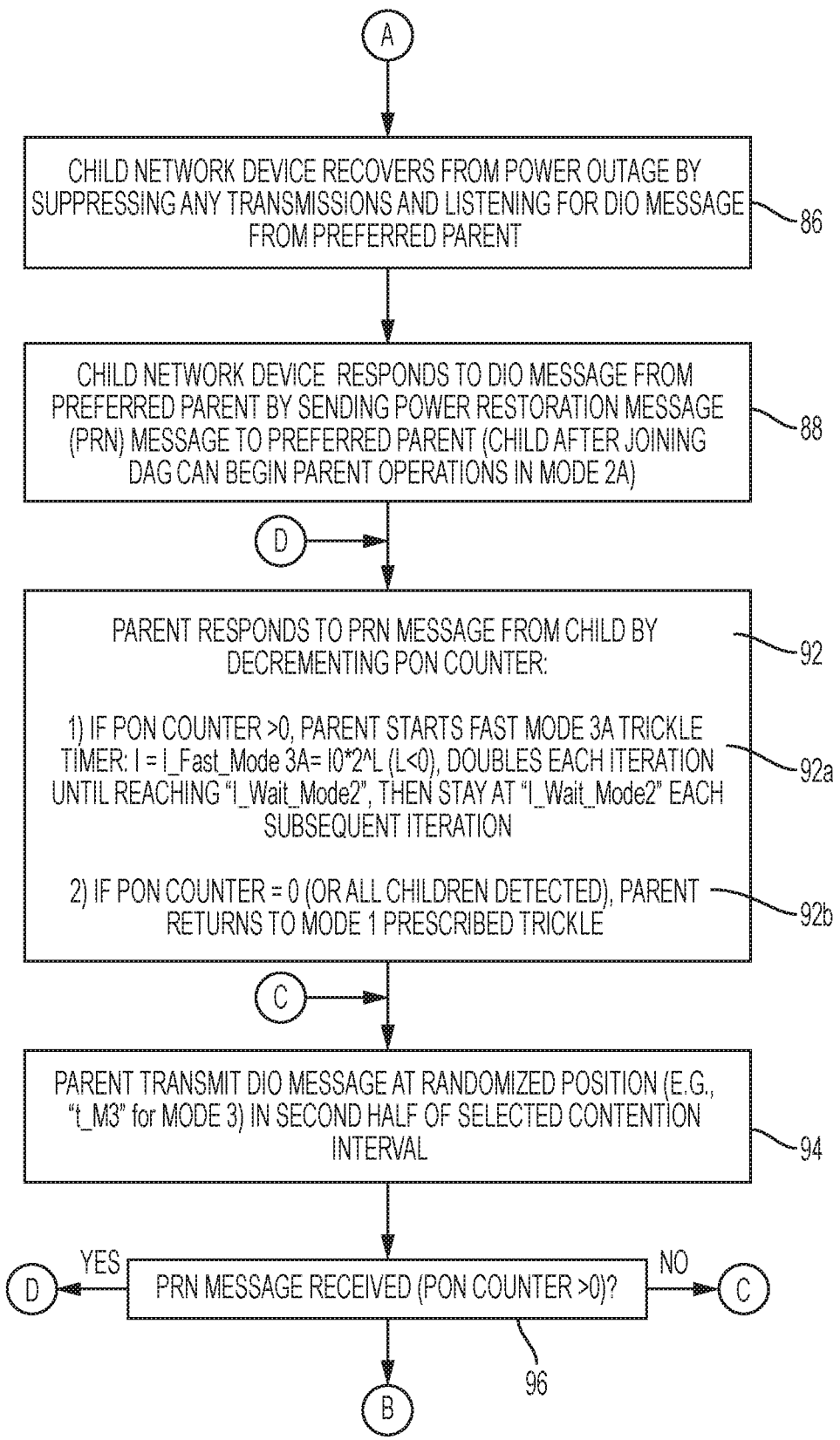

Proactive Reform of Directed Acyclic Graph by Accelerating Parent Advertisements FIGS. 5A and 5B are diagrams illustrating a method of executing proactive reform of a tree-based topology (e.g., a directed acyclic graph (DAG)) by suppressing child transmissions and accelerating parent advertisements, according to an example embodiment. FIGS. 6A-6D illustrate an example data network 10' having RPL network devices for executing the proactive reform of the DAG 68 by suppressing child transmissions and accelerating parent advertisements, according to an example embodiment.

The foregoing description with respect to FIGS. 1-4 ensures root-originated messages can be evenly and reliably propagated throughout the entire data network, without any interference by "lower" network devices that are located in "lower" rings, enabling substantial reduction in the time required to form a DODAG in a data network such as an LLN.

As illustrated with respect to FIGS. 5-6, network devices 12 in a LLN data network (e.g., 10 of FIGS. 1A-1E or 10' of FIGS. 6A-6D) having a DAG topology 68 are configured to execute fast and proactive reform of the directed acyclic graph having encountered at least a partial power outage. In contrast to the description with respect to FIGS. 1-4, the example embodiment described with respect to FIGS. 5-6 enable parent network devices to proactively and quickly reform the directed acyclic graph based on acceleration of parent advertisements, while child network devices having encountered a power outage suppress any transmissions upon recovery from the power outage until having received an advertisement (e.g., DIO) from the preferred parent: the suppression of transmission by child network devices having recovered from a power outage ensures that the child network device do not interfere with attempts by preferred parent network devices to transmit advertisement messages for reformation (i.e., recovery) of a network topology.

The acceleration of parent advertisements (especially in combination with suppression by the child network devices) enables parent network device to proactively reform a RPL DAG in a portion of the DAG having encountered a power loss, as the child network devices can rapidly rejoin their preferred parents without the necessity of transmitting any request messages. The rapid reformation of a DAG having encountered a partial loss is particularly important for network operators, particularly in AMI networks. For example, a desired goal is ninety percent (90%) of network recovery within fifteen (15) minutes in an 8-hop network of around one thousand (1000) devices, for example where recovery is identified by recovering network devices transmitting a power restoration message (PRN) to a parent network device.

An important application of Smart Grid AMI networks is to provide communication and notification of power outages and power restorations. In some cases, an Internet of Things (IoT) or LLN network may use Power Outage Notification (PON) and corresponding Power Restoration Notification (PRN) messages to convey information about such an power events. In general, PONs allow a utility to determine the occurrence and location of power outages. Similarly, PRNs allow a power utility to determine when and where power is restored. For example, a power outage management system (OMS) may analyze PONs and PRNs, to determine the current state of the power grid and, if necessary, initiate repairs.

Figure 6A:
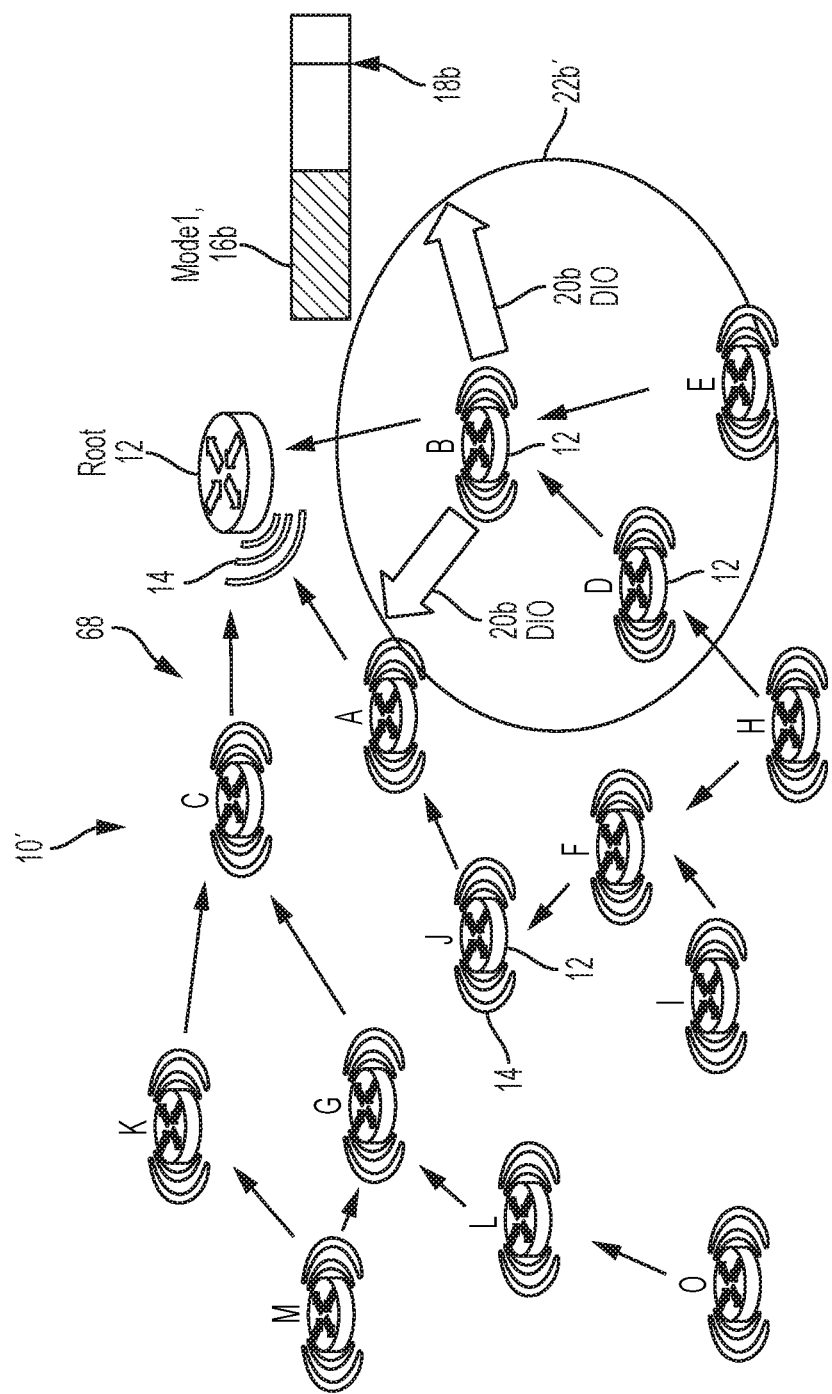
FIGS. 6A-6D illustrate an example data network having RPL network devices for executing the proactive reform of the DAG by suppressing child transmissions and accelerating parent advertisements, according to an example embodiment.
Figure 6B:
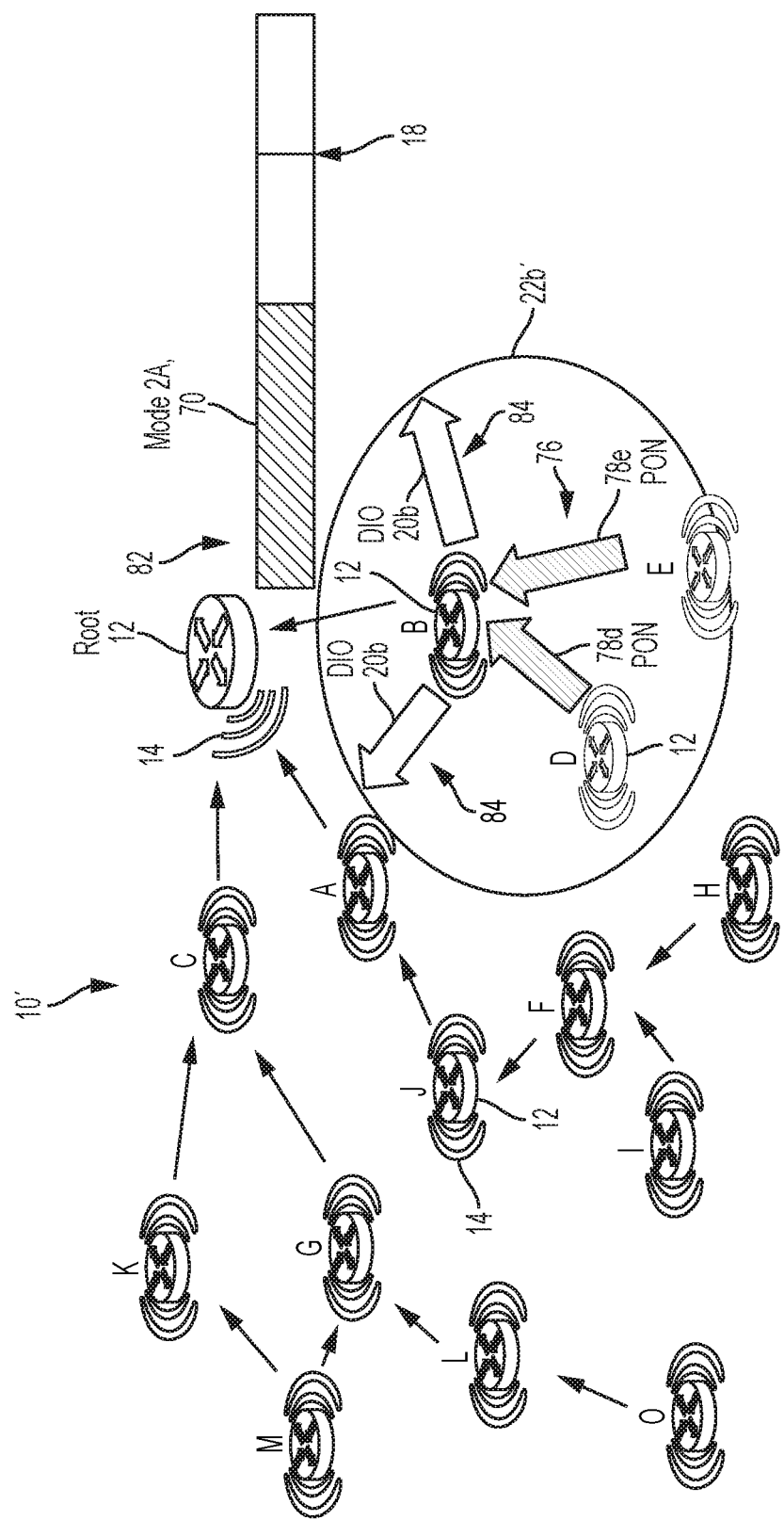
Figure 6C:
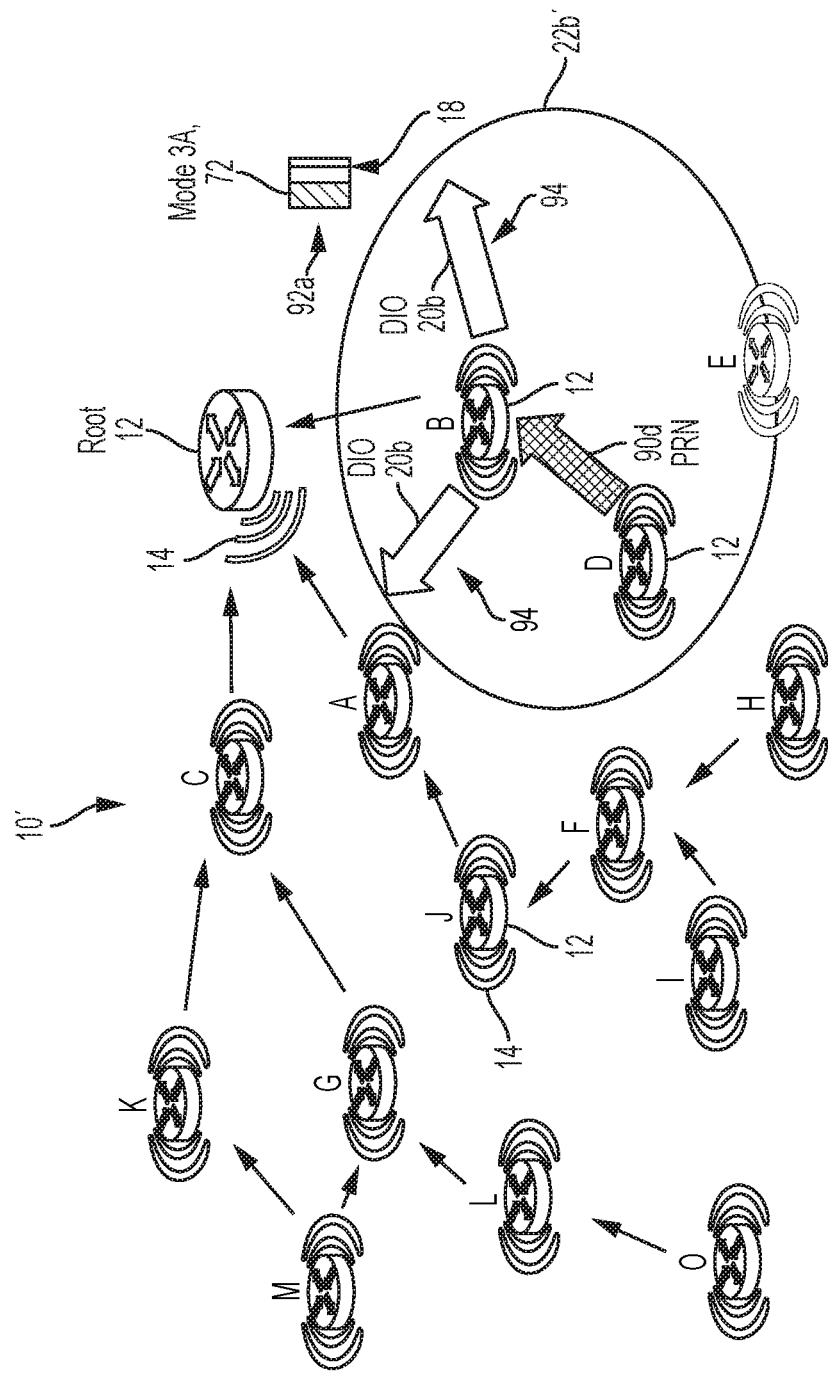

As described with respect to FIGS. 5-6, parent network devices can use three modes of Trickle operations for proactive reform of the RPL DAG topology 68, namely: the previously-described "mode 1" operation (42 of FIG. 3) (i.e., "first Trickle operation") that utilizes a first selected minimum contention interval "I0=I_Mode1" ("Mode 1" 16b of FIG. 6A), where "Imin≤I_Mode1≤Imax"; a "wait-for-recovery" mode "2A" operation (i.e., "second Trickle operation") that utilizes a second selected minimum contention interval "I_Wait_Mode2" ("Mode 2A" 70 of FIG. 6B); and a "fast" mode "3A" operation (i.e., "third Trickle operation") that utilizes a third selected minimum contention interval "I_Fast_Mode 3A" ("Mode 3A" 72 of FIG. 6C).

Referring to FIG. 5A, and FIG. 6A, the processor circuit 32 of each child network device (e.g., "D" and "E") 12 in operation 74 is configured for attaching to a preferred parent network device (e.g., "B") 12 in response to detecting the DIO message 20 output by the parent network device "B" 12 within its transmission range 22b'. As illustrated in FIG. 6A, the parent network device "B" can use mode 1 (where "Imin≤I_Mode1≤Imax") during initial network formation as described previously with respect to FIG. 1C, causing the parent network device "B" 12 to transmit its DIO message 20b at the randomized position 18b within the second half of the first selected minimum contention interval "I" 16b. As described below, the first selected minimum contention interval also is referred to as "I0". The DIO message 20b can specify the link layer address (EUI-64 address) of the parent network device "B" 12, the corresponding ring identifier of the parent network device "B" 12, and other parameters as described previously and/or and as described in RFC 6550.

The processor circuit 32 of each child network device (e.g., "D", "E" of FIG. 6A) can be configured for responding to attachment to the preferred parent network device "B" 12 in operation 74 by storing the advertised parent parameters (e.g., EUI-64 address, ring identifier, etc.) in at least a non-volatile portion of the memory circuit 34; alternately, the processor circuit 32 of each child network device can be configured for storing the advertised parent parameters in non-volatile memory (e.g., in the memory circuit 34) in response to detecting a power outage, where power supply circuitry in a child network device processor circuit 32 can send an alert signal to the processor circuit 32 in response to a loss of power from an external power source, causing the processor circuit 32 to utilize a local battery to store the advertised parent parameters in the non-volatile memory.

The processor circuit 32 of a child device (e.g., "D", "E" of FIG. 6B) 12, having encountered a power outage, can respond to the detected power outage in operation 76 by using its local battery to cause unicast transmission (by the device interface circuit 30) of a power outage notification (PON) message (e.g., 78d, 78e) to its preferred parent device "B".

The processor circuit 32 of the parent network device "B" 12 in operation 80 is configured to detect the loss of the attached child network devices ("D", "E" of FIG. 6B), for example in response to the device interface circuit 30 of the parent network device "B" 12 receiving the power outage notification (PON) messages 78d, 78e output by the attached child network devices "D", "E" 12; in this example the processor circuit 32 of the parent network device "B" 12 is configured to increment in operation 80a a counter in response to each received PON message. The processor circuit 32 also can be configured for detecting the loss of the child network devices "D", "E" 12 in operation 80b, based on a detected absence of any data packets expected from the two or more child network devices "D", "E" within a prescribed time interval; the expected data packets can be based on, for example, link layer scheduling such as 6TiSCH, TSCH, or another protocol that allocates transmission times to the child network devices "D", "E" 12. If in operation 80b only a single attached child device is determined to be absent from transmitting any expected data traffic, it is assumed that the single absent child device is either rebooting and/or inoperable (e.g., "dead"), in which case the parent network device "B" 12 can initiate transmitting one or more link-layer ping messages to locate the single absent child device.

The processor circuit 32 of the parent network device "B" 12 in operation 82 is configured for responding to the detected loss of attached child network devices by starting a second Trickle operation, namely the "wait-for-recovery" mode "2A" operation that utilizes a second selected minimum contention interval "I_Wait_Mode2" ("Mode 2A" 70 of FIG. 6B). In particular, the processor circuit 32 of the parent network device "B" 12 in operation 82 is configured for setting the second selected minimum contention interval "I_Wait_Mode2" 70 based on "I0", where "Imin≤I0≤Imax", and "I_Wait_Mode2=I0*2^L", where "L" is a topological constant integer value greater than or equal to zero ("L≥0") (the symbol "^" refers to an exponent operation, i.e., "2^L" is equivalent to "$2^L$". The topological constant integer value "L" can have a value of "0" or "1" for a large-scale network (e.g., 500 devices or more), or a value of "1" or "2" for smaller-scale networks (e.g., 500 devices or less).

Hence, the processor circuit 32 of the parent network device "B" 12 in operation 84 can transmit its DIO message 20b at the randomized position "t" 18 within the second half of the corresponding second selected minimum contention interval "I_Wait_Mode2" 70. In contrast with the "mode 1" operation that doubles the value of the first selected minimum contention interval "I" 16 (upon expiration thereof) until reaching prescribed maximum interval "Imax" according to RFC 6206, the processor circuit 32 of the parent network device "B" 12 can maintain the second selected minimum contention interval "I_Wait_Mode2" 70 for subsequent iterations of the second Trickle operation. Hence, the processor circuit 32 of the parent network device "B" 12 in operation 84 can repeat the second Trickle operation by using the same (i.e., constant) second selected minimum contention interval "I_Wait_Mode2" 70 for each iteration of the transmission of the DIO message 20b, enabling the parent network device "B" 12 to effectively use the DIO message 20b as a proactive "beacon" that is transmitted at a constant transmission rate for the lost child network devices "D", "E" that are awaiting recovery from the localized power outage.

Referring to FIG. 5B and FIG. 6C, assume that the child network device "D" 12 first recovers from its power outage: the processor circuit 32 of each child network device (e.g., "D") is configured for causing in operation 86 the corresponding device interface circuit 30 to suppress any transmissions (e.g., PRN messages, DIS messages, etc.) until reception of a DIO message 20b from its preferred parent as identified by its EUI-64 address stored in the non-volatile memory of the child network device. Hence, the processor circuit 32 of the child network device "D" 12 suppresses any transmissions and listens in operation 86 for a DIO message 20b by the preferred parent network device "B" at the next transmission randomized position "t" 18 in the second half of the second selected minimum contention interval "I_Wait_Mode2" 70.

The processor circuit 32 of the child network device "D" 12, in response to receiving the DIO message 20 by the preferred parent network device "B" operating according to second Trickle operation, is configured for causing the device interface circuit 30 to unicast transmit in operation 88 a PRN message (90d of FIG. 6C) to its preferred parent network device "B" indicating the child network device "D" 12 has reattached to the preferred parent network device "B". The child network device "D" 12, having reattached to its preferred parent network device "B", can begin parent operations according to the second Trickle operation (Mode 2A) as described with respect to operations 82 and 84, etc., including setting a corresponding second selected minimum contention interval "I_Wait_Mode2" 70.

In response to receiving the PRN message 90d, the processor circuit 32 of the preferred parent network device "B" 12 in operation 92 can decrement the PON counter that was incremented previously in operation 80a: if the PON counter after decrementing remains a nonzero value (PON>0), the processor circuit 32 of the preferred parent network device "B" 12 is configured for initiating in operation 92a a "fast" mode "3A" operation (i.e., "third Trickle operation") that utilizes a third selected minimum contention interval "I_Fast_Mode 3A" ("Mode 3A" 72 of FIG. 6C). The third Trickle operation provides an accelerated transmission rate of the DIO advertisement message 20 that is faster than the first Trickle operation and the second Trickle operation, based on selecting a third selected minimum contention interval "I_Fast_Mode 3A" 72, i.e., "I_Fast_Mode 3A=I0*2^L" where the constant "L" is a constant negative integer value (i.e., "L<0"). The value of "L" can be equal to "−3" or "−2" for a large scale network, or "L" can be set to a value of "−2" or "−1" in a small-scale network. Hence, the third selected minimum contention interval "I_Fast_Mode 3A" 72 can have a range of shorter than one eighth (i.e., I0*2⁻³) the first selected minimum contention interval "I" 16 up to the second selected minimum contention interval "I_Wait_Mode2" 70, enabling the processor circuit 32 of the parent network device "B" in operation 94 to accelerate the transmission of the DIO message 20*b* at the randomized position "t" 18 within the second half of the third selected minimum contention interval "I_Fast_Mode 3A" 72.

In contrast to mode "2A", the value of the third selected minimum contention interval "I_Fast_Mode 3A" 72 is doubled each iteration of the third Trickle operation in operations 92*a* and 94 until the selected contention interval "I" in mode "3A" reaches the duration of the DIO message 20, at which point the selected contention interval "I" in mode "3A" maintains in operation 92*a* and 94 the second selected minimum contention interval "I_Wait_Mode2" 70 for each subsequent iteration of the third Trickle operation while waiting for additional child network devices to recover.

Hence, the parent network device "B", in response to detecting the first PRN message 90*d*, can initiate the accelerated transmission rate and provide a "burst" of accelerated transmissions of the DIO message 20 that are slowed each iteration (by doubling the selected contention interval duration) until reaching the constant rate of the second selected minimum contention interval "I_Wait_Mode2" 70. The proactive acceleration of the transmission rate of the DIO message 20*b* enables any remaining lost child network devices (e.g., "E") to detect the DIO message 20*b* as soon as it has recovered from the power loss. Hence, the parent network device "B" continues in mode "3A" by repeating operation 94 (doubling the third selected minimum contention interval "I_Fast_Mode 3A" 72 after each iteration until reaching the second selected minimum contention interval "I_Wait_Mode2" 70) while the PON counter is still greater than zero in operation 96.

Figure 6D:
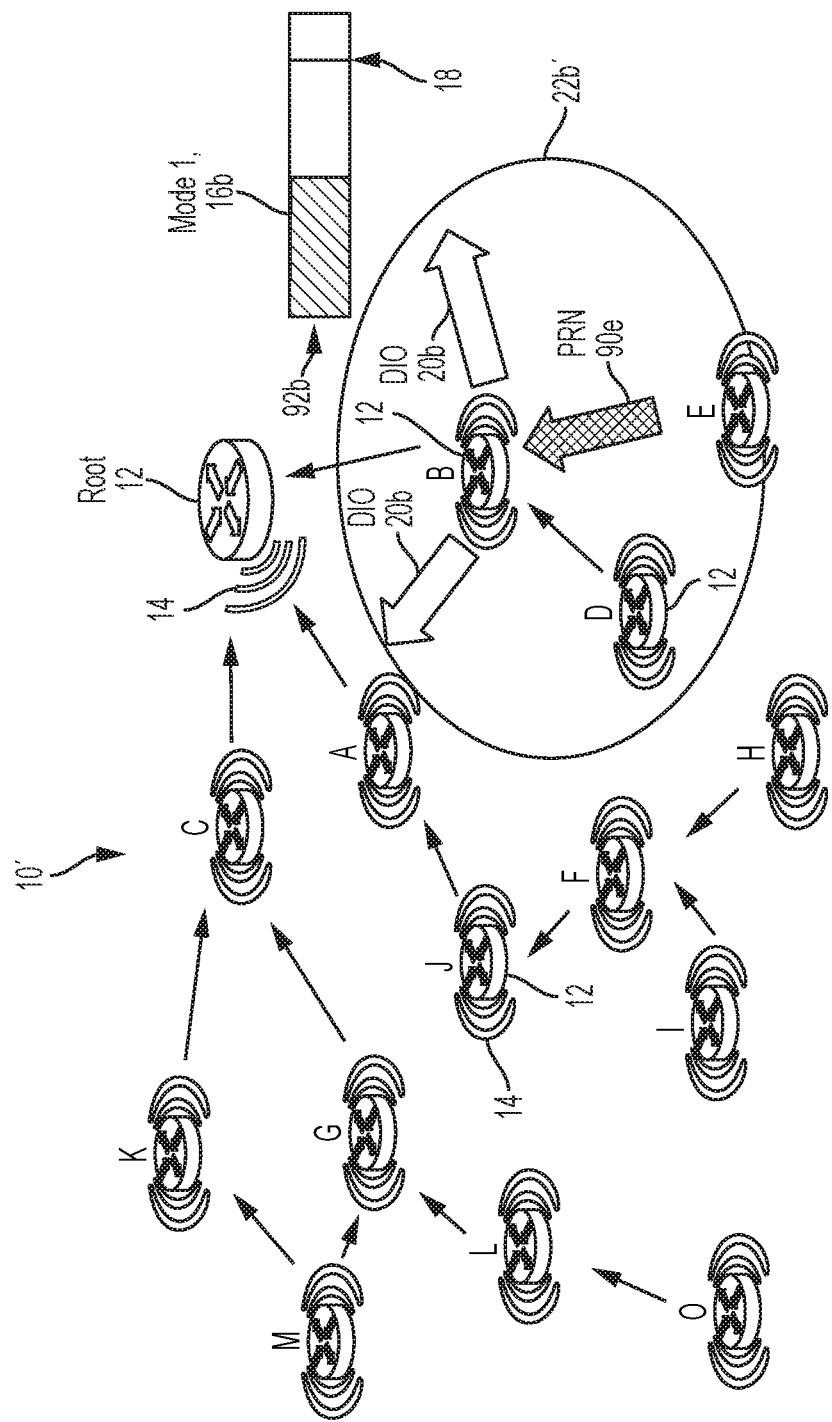

Hence, the child network device "E" in FIG. 6D, in response to recovering from the power outage in operation 86, can suppress any transmissions and transmit its PRN message 90*e* only in response to detecting the DIO message 20*b* in operation 88. Hence, the parent network device "B", in response to detecting the PRN message 90*e* in operation 96, can decrement the PON counter in operation 92: since receipt of the PRN message 90*e* causes the parent network device "B" to decrement its PON counter to zero, the processor circuit 32 of the parent network device in operation 92*b* returns to the "Mode 1" Trickle operation (i.e., the first Trickle operation) using the first selected minimum contention interval "I" 16*b*, to resume normal operations.

According to example embodiments, a parent network device can proactively adjust its Trickle operations in response to detecting its child network devices have suffered power outage, enabling the child network devices to quickly detect the parent advertisement messages without the necessity of any soliciting by the child network devices after rebooting. Hence, individual soliciting messages by child network devices can be minimized.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    detecting, by a parent network device operating according to a first Trickle operation relative to a first selected minimum contention interval in a data network having a tree-based topology, a loss of one or more attached child network devices in the data network based on one or more of receiving one or more outage notification messages, or detecting an absence of one or more expected data packets;
    starting, by the parent network device, a second Trickle operation relative to a second selected minimum contention interval in response to detecting the loss, wherein the second selected minimum contention interval is one of equal to the first selected minimum contention interval or greater than the first selected minimum contention interval, the first Trickle operation and the second Trickle operation each requiring the parent network device to wait at least a first half of the corresponding selected minimum contention interval before attempting transmission of an advertisement message at a randomized position within a second half of the corresponding selected minimum contention interval, the second Trickle operation including maintaining the second selected minimum contention interval for subsequent iterations of the second Trickle operation; and
    initiating, by the parent network device in response to receiving a message from one of the lost child network devices that indicates the one lost child network device has recovered its attachment to the parent network device as a recovered child device, an accelerated transmission rate of the advertisement message that is faster than the first and second Trickle operations, and resuming the first Trickle operation upon recovery of all the lost child network devices;
    wherein the initiating the accelerated transmission rate includes starting a third operation relative to a third selected minimum contention interval having a duration of one half or less of the first selected minimum contention interval.

2. The method of claim 1, wherein the initiating an accelerated transmission rate includes:
    starting the third operation as a third Trickle operation relative to the third selected minimum contention interval having the duration of less than the first minimum contention interval;
    transmitting the advertisement message at a randomized position within a second half of the third selected minimum contention interval, the randomized position within the second half of the third selected minimum contention interval establishing the accelerated rate;
    doubling the duration of the third selected minimum contention interval for subsequent iterations of the third Trickle operation until reaching the second selected minimum contention interval; and
    maintaining the second selected minimum contention interval for subsequent iterations of the third Trickle operation upon reaching the second selected minimum contention interval.

3. The method of claim 2, wherein:
    the second selected minimum contention interval is one of equal to the first selected minimum contention interval or a multiple of the first selected minimum contention interval;

the duration of the third selected minimum contention interval is one half or less of the first selected minimum contention interval.

4. The method of claim 1, wherein:
the detecting of the loss of attached child network devices includes receiving power outage notification (PON) messages as said outage notification messages by the attached child network devices, and incrementing a counter for each received PON message;
the accelerating based on receiving a power restoration notification (PRN) message as said message from the one lost child network device.

5. The method of claim 4, wherein the accelerating further comprises:
decrementing the counter for each received PRN message from a corresponding lost child network device; and
halting the accelerating and resuming the first Trickle operation in response to the counter being decremented to zero.

6. The method of claim 1, wherein the parent network device operates as an attached child to a higher parent device in the data network prior to operating as said parent network device, the method further comprising:
the attached child sending to the higher parent device a power outage notification (PON) message to the higher parent device and storing higher parent device parameters in nonvolatile memory in response to detecting a loss of power;
the attached child responding to recovery of the loss of power by suppressing any transmission until receipt of a parent advertisement message from the higher parent device.

7. The method of claim 6, further comprising the attached child initiating transmission of a power restoration notification (PRN) message only in response to receiving the parent advertisement message from the higher parent device.

8. An apparatus comprising:
a device interface circuit; and
a processor circuit configured for detecting a loss of one or more attached child network devices in a data network based on one or more of receiving one or more outage notification messages, or detecting an absence of one or more expected data packets, the apparatus operating as a parent network device in the data network having a tree-based topology, the processor circuit configured for operating according to a first Trickle operation relative to a first selected minimum contention interval;
the processor circuit further configured for starting execution of a second Trickle operation relative to a second selected minimum contention interval in response to detecting the loss, wherein the second selected minimum contention interval is one of equal to the first selected minimum contention interval or greater than the first selected minimum contention interval, the first Trickle operation and the second Trickle operation each requiring the parent network device to wait at least a first half of the corresponding selected minimum contention interval before attempting transmission, by the device interface circuit, of an advertisement message at a randomized position within a second half of the corresponding selected minimum contention interval, the execution of the second Trickle operation including the processor circuit maintaining the second selected minimum contention interval for subsequent iterations of the second Trickle operation;
the processor circuit further configured for initiating, in response to the device interface circuit receiving a message from one of the lost child network devices that indicates the one lost child network device has recovered its attachment to the parent network device as a recovered child device, an accelerated transmission rate of the advertisement message that is faster than the first and second Trickle operations, and resuming the first Trickle operation upon recovery of all the lost child network devices;
wherein the processor circuit is configured for initiating the accelerated transmission rate based on starting a third operation relative to a third selected minimum contention interval having a duration of one half or less of the first selected minimum contention interval.

9. The apparatus of claim 8, wherein the processor circuit further is configured for initiating the accelerated transmission rate based on:
starting the third operation as a third Trickle operation relative to the third selected minimum contention interval having the duration of less than the first minimum contention interval;
causing transmission of the advertisement message at a randomized position within a second half of the third selected minimum contention interval, the randomized position within the second half of the third selected minimum contention interval establishing the accelerated rate;
doubling the duration of the third selected minimum contention interval for subsequent iterations of the third Trickle operation until reaching the second selected minimum contention interval; and
maintaining the second selected minimum contention interval for subsequent iterations of the third Trickle operation upon reaching the second selected minimum contention interval.

10. The apparatus of claim 9, wherein:
the processor circuit is configured to set the second selected minimum contention interval to one of equal to the first selected minimum contention interval or a multiple of the first selected minimum contention interval;
the processor circuit is configured to set the duration of the third selected minimum contention interval to one half or less of the first selected minimum contention interval.

11. The apparatus of claim 8, wherein:
the processor circuit is configured to detect of the loss of attached child network devices in response to the device interface circuit receiving power outage notification (PON) messages as said outage notification messages by the attached child network devices, the processor circuit is configured to increment a counter in response to each received PON message;
the processor circuit is configured to initiate the accelerated transmission rate in response to the device interface circuit receiving a power restoration notification (PRN) message as said message from the one lost child network device.

12. The apparatus of claim 11, wherein:
the processor circuit is configured to decrement the counter in response to each received PRN message from a corresponding lost child network device; and
the processor circuit is configured to halt the accelerated transmission rate and resume the first Trickle operation in response to the counter being decremented to zero.

13. The apparatus of claim 8, further comprising:
a nonvolatile memory configured for storing higher parent device parameters;
wherein the processor circuit is configured for causing the apparatus to operate as an attached child to a higher parent device in the data network prior to operating as said parent network device;
the processor circuit further configured for responding to a detected loss of power by storing the higher parent device parameters in the nonvolatile memory, and causing the device interface circuit to send to the higher parent device a power outage notification (PON) message;
the processor circuit further configured for responding to recovery of the loss of power by causing the device interface circuit to suppress any transmission until receipt of a parent advertisement message from the higher parent device.

14. The apparatus of claim 13, wherein the processor circuit is configured for initiating transmission of a power restoration notification (PRN) message only in response to receiving the parent advertisement message from the higher parent device.

15. One or more non-transitory tangible media encoded with logic for execution by a machine and when executed by the machine operable for:
detecting, by the machine implemented as a parent network device operating according to a first Trickle operation relative to a first selected minimum contention interval in a data network having a tree-based topology, a loss of one or more attached child network devices in the data network based on one or more of receiving one or more outage notification messages, or detecting an absence of one or more expected data packets;
starting, by the parent network device, a second Trickle operation relative to a second selected minimum contention interval in response to detecting the loss, wherein the second selected minimum contention interval is one of equal to the first selected minimum contention interval or greater than the first selected minimum contention interval, the first Trickle operation and the second Trickle operation each requiring the parent network device to wait at least a first half of the corresponding selected minimum contention interval before attempting transmission of an advertisement message at a randomized position within a second half of the corresponding selected minimum contention interval, the second Trickle operation including maintaining the second selected minimum contention interval for subsequent iterations of the second Trickle operation; and
initiating, by the parent network device in response to receiving a message from one of the lost child network devices that indicates the one lost child network device has recovered its attachment to the parent network device as a recovered child device, an accelerated transmission rate of the advertisement message that is faster than the first and second Trickle operations, and resuming the first Trickle operation upon recovery of all the lost child network devices;
wherein the initiating the accelerated transmission rate includes starting a third operation relative to a third selected minimum contention interval having a duration of one half or less of the first selected minimum contention interval.

16. The one or more non-transitory tangible media of claim 15, wherein the initiating an accelerated transmission rate includes:
starting the third operation as a third Trickle operation relative to the third selected minimum contention interval having the duration of less than the first minimum contention interval;
transmitting the advertisement message at a randomized position within a second half of the third selected minimum contention interval, the randomized position within the second half of the third selected minimum contention interval establishing the accelerated rate;
doubling the duration of the third selected minimum contention interval for subsequent iterations of the third Trickle operation until reaching the second selected minimum contention interval; and
maintaining the second selected minimum contention interval for subsequent iterations of the third Trickle operation upon reaching the second selected minimum contention interval.

17. The one or more non-transitory tangible media of claim 15, wherein:
the detecting of the loss of attached child network devices includes receiving power outage notification (PON) messages as said outage notification messages by the attached child network devices, and incrementing a counter for each received PON message;
the accelerating based on receiving a power restoration notification (PRN) message as said message from the one lost child network device.

18. The one or more non-transitory tangible media of claim 17, wherein the accelerating further comprises:
decrementing the counter for each received PRN message from a corresponding lost child network device; and
halting the accelerating and resuming the first Trickle operation in response to the counter being decremented to zero.

19. The one or more non-transitory tangible media of claim 15, wherein the parent network device operates as an attached child to a higher parent device in the data network prior to operating as said parent network device, the one or more non-transitory tangible media further operable for:
the attached child sending to the higher parent device a power outage notification (PON) message to the higher parent device and storing higher parent device parameters in nonvolatile memory in response to detecting a loss of power;
the attached child responding to recovery of the loss of power by suppressing any transmission until receipt of a parent advertisement message from the higher parent device.

20. The one or more non-transitory tangible media of claim 19, further operable for the attached child initiating transmission of a power restoration notification (PRN) message only in response to receiving the parent advertisement message from the higher parent device.

* * * * *